(12) United States Patent
Albu et al.

(10) Patent No.: US 8,989,516 B2
(45) Date of Patent: *Mar. 24, 2015

(54) IMAGE PROCESSING METHOD AND APPARATUS

(75) Inventors: Felix Albu, Bucuresti (RO); Adrian Zamfir, Bucuresti (RO)

(73) Assignee: FotoNation Limited, Ballybrit, Galway (IE)

( * ) Notice: Subject to any disclaimer, the term of this patent is extended or adjusted under 35 U.S.C. 154(b) by 977 days.

This patent is subject to a terminal disclaimer.

(21) Appl. No.: 12/336,416

(22) Filed: Dec. 16, 2008

(65) Prior Publication Data

US 2009/0179999 A1    Jul. 16, 2009

Related U.S. Application Data

(63) Continuation-in-part of application No. 11/856,721, filed on Sep. 18, 2007, and a continuation-in-part of application No. 12/116,140, filed on May 6, 2008, now Pat. No. 7,995,855.

(60) Provisional application No. 61/023,774, filed on Jan. 25, 2008.

(51) Int. Cl.
*G06K 9/40* (2006.01)
*G06T 3/40* (2006.01)
(Continued)

(52) U.S. Cl.
CPC ............. *G06T 3/4053* (2013.01); *G06T 5/50* (2013.01); *G06T 5/002* (2013.01); *G06T 5/003* (2013.01); *G06T 5/20* (2013.01); *G06T 2207/20012* (2013.01); *G06T 2207/10024* (2013.01)
USPC ............................ 382/275; 382/255; 382/167

(58) Field of Classification Search
USPC ........................................ 382/275, 255, 167
See application file for complete search history.

(56) References Cited

U.S. PATENT DOCUMENTS 5,251,019 A    10/1993    Moorman et al.
5,374,956 A    12/1994    D'Luna
(Continued)

FOREIGN PATENT DOCUMENTS

DE    3729324 A1    3/1989
DE    10154203 A1   6/2002
(Continued)

OTHER PUBLICATIONS

John Russ, The Image Processing Handbook, CRC Press 2002.*
(Continued)

*Primary Examiner* — Chan Park
*Assistant Examiner* — Mark Roz
(74) *Attorney, Agent, or Firm* — Hickman Palermo Truong Becker Bingham Wong LLP

(57) ABSTRACT

An image processing apparatus is arranged to process a first relatively underexposed and sharp image of a scene, and a second relatively well exposed and blurred image, nominally of the same scene, the first and second images being derived from respective image sources. The apparatus provides a portion of the relatively first underexposed image as an input signal to an adaptive filter; and a corresponding portion of the second relatively well exposed image as a desired signal to the adaptive filter. The adaptive filter produces an output signal from the input signal and the desired signal; and an image generator constructs a first filtered image from the output signal, relatively less blurred than the second image.

79 Claims, 14 Drawing Sheets

(51) Int. Cl.
*G06T 5/50* (2006.01)
*G06T 5/00* (2006.01)
*G06T 5/20* (2006.01)

(56) References Cited

U.S. PATENT DOCUMENTS

| | | | |
|---|---|---|---|
| 5,392,088 A | 2/1995 | Abe et al. |
| 5,428,723 A | 6/1995 | Ainscow et al. |
| 5,510,215 A | 4/1996 | Prince et al. |
| 5,599,766 A | 2/1997 | Boroson et al. |
| 5,686,383 A | 11/1997 | Long et al. |
| 5,747,199 A | 5/1998 | Roberts et al. |
| 5,751,836 A | 5/1998 | Wildes et al. |
| 5,756,239 A | 5/1998 | Wake |
| 5,756,240 A | 5/1998 | Roberts et al. |
| 5,802,220 A | 9/1998 | Black et al. |
| 5,889,277 A | 3/1999 | Hawkins et al. |
| 5,889,554 A | 3/1999 | Mutze |
| 5,909,242 A | 6/1999 | Kobayashi et al. |
| 5,981,112 A | 11/1999 | Roberts |
| 6,028,960 A | 2/2000 | Graf et al. |
| 6,035,072 A | 3/2000 | Read |
| 6,041,078 A | 3/2000 | Rao |
| 6,061,462 A | 5/2000 | Tostevin et al. |
| 6,081,606 A | 6/2000 | Hansen et al. |
| 6,114,075 A | 9/2000 | Long et al. |
| 6,122,017 A | 9/2000 | Taubman |
| 6,124,864 A | 9/2000 | Madden et al. |
| 6,134,339 A | 10/2000 | Luo |
| 6,269,175 B1 | 7/2001 | Hanna et al. |
| 6,297,071 B1 | 10/2001 | Wake |
| 6,297,846 B1 | 10/2001 | Edanami |
| 6,326,108 B2 | 12/2001 | Simons |
| 6,330,029 B1 | 12/2001 | Hamilton et al. |
| 6,360,003 B1 | 3/2002 | Doi et al. |
| 6,365,304 B2 | 4/2002 | Simons |
| 6,381,279 B1 | 4/2002 | Taubman |
| 6,387,577 B2 | 5/2002 | Simons |
| 6,407,777 B1 | 6/2002 | DeLuca |
| 6,535,244 B1 | 3/2003 | Lee et al. |
| 6,555,278 B1 | 4/2003 | Loveridge et al. |
| 6,567,536 B2 | 5/2003 | McNitt et al. |
| 6,599,668 B2 | 7/2003 | Chari et al. |
| 6,602,656 B1 | 8/2003 | Shore et al. |
| 6,607,873 B2 | 8/2003 | Chari et al. |
| 6,618,491 B1 | 9/2003 | Abe |
| 6,625,396 B2 | 9/2003 | Sato |
| 6,643,387 B1 | 11/2003 | Sethuraman et al. |
| 6,741,960 B2 | 5/2004 | Kim et al. |
| 6,863,368 B2 | 3/2005 | Sadasivan et al. |
| 6,892,029 B2 | 5/2005 | Tsuchida et al. |
| 6,947,609 B2 | 9/2005 | Seeger et al. |
| 6,961,518 B2 | 11/2005 | Suzuki |
| 7,019,331 B2 | 3/2006 | Winters et al. |
| 7,072,525 B1 | 7/2006 | Covell |
| 7,084,037 B2 | 8/2006 | Gamo et al. |
| 7,160,573 B2 | 1/2007 | Sadasivan et al. |
| 7,177,538 B2 | 2/2007 | Sato et al. |
| 7,180,238 B2 | 2/2007 | Winters |
| 7,195,848 B2 | 3/2007 | Roberts |
| 7,292,270 B2 | 11/2007 | Higurashi et al. |
| 7,315,324 B2 | 1/2008 | Cleveland et al. |
| 7,315,630 B2 | 1/2008 | Steinberg et al. |
| 7,315,631 B1 | 1/2008 | Corcoran et al. |
| 7,316,630 B2 | 1/2008 | Tsukada et al. |
| 7,316,631 B2 | 1/2008 | Tsunekawa |
| 7,317,815 B2 | 1/2008 | Steinberg et al. |
| 7,336,821 B2 | 2/2008 | Ciuc et al. |
| 7,369,712 B2 | 5/2008 | Steinberg et al. |
| 7,403,643 B2 | 7/2008 | Ianculescu et al. |
| 7,453,493 B2 | 11/2008 | Pilu |
| 7,453,510 B2 | 11/2008 | Kolehmainen et al. |
| 7,460,695 B2 | 12/2008 | Steinberg et al. |
| 7,469,071 B2 | 12/2008 | Drimbarean et al. |
| 7,489,341 B2 | 2/2009 | Yang et al. |
| 7,548,256 B2 | 6/2009 | Pilu |
| 7,551,755 B1 | 6/2009 | Steinberg et al. |
| 7,565,030 B2 | 7/2009 | Steinberg et al. |
| 7,593,144 B2 | 9/2009 | Dymetman |
| 7,623,153 B2 | 11/2009 | Hatanaka |
| 7,657,172 B2 | 2/2010 | Nomura et al. |
| 7,692,696 B2 | 4/2010 | Steinberg et al. |
| 2001/0036307 A1 | 11/2001 | Hanna et al. |
| 2002/0006163 A1 | 1/2002 | Hibi et al. |
| 2003/0052991 A1 | 3/2003 | Stavely et al. |
| 2003/0058361 A1 | 3/2003 | Yang |
| 2003/0091225 A1 | 5/2003 | Chen |
| 2003/0103076 A1 | 6/2003 | Neuman |
| 2003/0151674 A1 | 8/2003 | Lin |
| 2003/0152271 A1 | 8/2003 | Tsujino et al. |
| 2003/0169818 A1 | 9/2003 | Obrador |
| 2003/0193699 A1 | 10/2003 | Tay |
| 2003/0219172 A1 | 11/2003 | Caviedes et al. |
| 2004/0066981 A1 | 4/2004 | Li et al. |
| 2004/0076335 A1 | 4/2004 | Kim |
| 2004/0090532 A1 | 5/2004 | Imada |
| 2004/0120598 A1 | 6/2004 | Feng |
| 2004/0120698 A1 | 6/2004 | Hunter |
| 2004/0130628 A1 | 7/2004 | Stavely |
| 2004/0145659 A1 | 7/2004 | Someya et al. |
| 2004/0169767 A1 | 9/2004 | Norita et al. |
| 2004/0212699 A1 | 10/2004 | Molgaard |
| 2004/0218057 A1 | 11/2004 | Yost et al. |
| 2004/0218067 A1 | 11/2004 | Chen et al. |
| 2004/0247179 A1 | 12/2004 | Miwa et al. |
| 2005/0010108 A1 | 1/2005 | Rahn et al. |
| 2005/0019000 A1 | 1/2005 | Lim et al. |
| 2005/0031224 A1 | 2/2005 | Prilutsky et al. |
| 2005/0041121 A1 | 2/2005 | Steinberg et al. |
| 2005/0041123 A1 | 2/2005 | Ansari et al. |
| 2005/0047672 A1 | 3/2005 | Ben-Ezra et al. |
| 2005/0052553 A1 | 3/2005 | Kido et al. |
| 2005/0057687 A1 | 3/2005 | Irani et al. |
| 2005/0068446 A1 | 3/2005 | Steinberg et al. |
| 2005/0068452 A1 | 3/2005 | Steinberg et al. |
| 2005/0140801 A1 | 6/2005 | Prilutsky et al. |
| 2005/0140829 A1 | 6/2005 | Uchida et al. |
| 2005/0195317 A1 | 9/2005 | Myoga |
| 2005/0201637 A1 | 9/2005 | Schuler et al. |
| 2005/0219391 A1 | 10/2005 | Sun et al. |
| 2005/0231625 A1 | 10/2005 | Parulski et al. |
| 2005/0248660 A1 | 11/2005 | Stavely et al. |
| 2005/0259864 A1 | 11/2005 | Dickinson et al. |
| 2005/0270381 A1 | 12/2005 | Owens et al. |
| 2005/0281477 A1 | 12/2005 | Shiraki et al. |
| 2006/0006309 A1 | 1/2006 | Dimsdale et al. |
| 2006/0017837 A1 | 1/2006 | Sorek et al. |
| 2006/0038891 A1 | 2/2006 | Okutomi et al. |
| 2006/0039690 A1 | 2/2006 | Steinberg et al. |
| 2006/0093212 A1 | 5/2006 | Steinberg et al. |
| 2006/0098237 A1 | 5/2006 | Steinberg et al. |
| 2006/0098890 A1 | 5/2006 | Steinberg et al. |
| 2006/0098891 A1 | 5/2006 | Steinberg et al. |
| 2006/0119710 A1 | 6/2006 | Ben-Ezra et al. |
| 2006/0120599 A1 | 6/2006 | Steinberg et al. |
| 2006/0125938 A1 | 6/2006 | Ben-Ezra et al. |
| 2006/0133688 A1 | 6/2006 | Kang et al. |
| 2006/0140455 A1 | 6/2006 | Costache et al. |
| 2006/0170786 A1 | 8/2006 | Won |
| 2006/0171464 A1 | 8/2006 | Ha |
| 2006/0187308 A1 | 8/2006 | Lim et al. |
| 2006/0204034 A1 | 9/2006 | Steinberg et al. |
| 2006/0204054 A1 | 9/2006 | Steinberg et al. |
| 2006/0204110 A1 | 9/2006 | Steinberg et al. |
| 2006/0227249 A1* | 10/2006 | Chen et al. .......... 348/631 |
| 2006/0285754 A1 | 12/2006 | Steinberg et al. |
| 2007/0025714 A1 | 2/2007 | Shiraki |
| 2007/0058073 A1 | 3/2007 | Steinberg et al. |
| 2007/0083114 A1 | 4/2007 | Yang et al. |
| 2007/0086675 A1 | 4/2007 | Chinen et al. |
| 2007/0097221 A1 | 5/2007 | Stavely et al. |
| 2007/0110305 A1 | 5/2007 | Corcoran et al. |
| 2007/0147820 A1 | 6/2007 | Steinberg et al. |
| 2007/0189748 A1 | 8/2007 | Drimbarean et al. |

(56) References Cited

U.S. PATENT DOCUMENTS

| | | |
|---|---|---|
| 2007/0201724 A1 | 8/2007 | Steinberg et al. |
| 2007/0234779 A1 | 10/2007 | Hsu et al. |
| 2007/0269108 A1 | 11/2007 | Steinberg et al. |
| 2007/0296833 A1 | 12/2007 | Corcoran et al. |
| 2008/0012969 A1 | 1/2008 | Kasai et al. |
| 2008/0037827 A1 | 2/2008 | Corcoran et al. |
| 2008/0037839 A1 | 2/2008 | Corcoran et al. |
| 2008/0037840 A1 | 2/2008 | Steinberg et al. |
| 2008/0043121 A1 | 2/2008 | Prilutsky et al. |
| 2008/0166115 A1 | 7/2008 | Sachs et al. |
| 2008/0175481 A1 | 7/2008 | Petrescu et al. |
| 2008/0211943 A1 | 9/2008 | Egawa et al. |
| 2008/0218611 A1 | 9/2008 | Parulski et al. |
| 2008/0219581 A1 | 9/2008 | Albu et al. |
| 2008/0219585 A1 | 9/2008 | Kasai et al. |
| 2008/0220750 A1 | 9/2008 | Steinberg et al. |
| 2008/0231713 A1 | 9/2008 | Florea et al. |
| 2008/0232711 A1 | 9/2008 | Prilutsky et al. |
| 2008/0240555 A1 | 10/2008 | Nanu et al. |
| 2008/0240607 A1 | 10/2008 | Sun et al. |
| 2008/0259175 A1 | 10/2008 | Muramatsu et al. |
| 2008/0267530 A1 | 10/2008 | Lim |
| 2008/0292193 A1 | 11/2008 | Bigioi et al. |
| 2008/0309769 A1 | 12/2008 | Albu et al. |
| 2008/0309770 A1 | 12/2008 | Florea et al. |
| 2009/0003652 A1 | 1/2009 | Steinberg et al. |
| 2009/0009612 A1 | 1/2009 | Tico et al. |
| 2009/0080713 A1 | 3/2009 | Bigioi et al. |
| 2009/0080796 A1 | 3/2009 | Capata et al. |
| 2009/0080797 A1 | 3/2009 | Nanu et al. |
| 2009/0179999 A1 | 7/2009 | Albu et al. |
| 2009/0185041 A1 | 7/2009 | Kang et al. |
| 2009/0185753 A1 | 7/2009 | Albu et al. |
| 2009/0190803 A1 | 7/2009 | Neghina et al. |
| 2009/0196466 A1 | 8/2009 | Capata et al. |
| 2009/0284610 A1 | 11/2009 | Fukumoto et al. |
| 2009/0303342 A1 | 12/2009 | Corcoran et al. |
| 2009/0303343 A1 | 12/2009 | Drimbarean et al. |
| 2010/0026823 A1 | 2/2010 | Sawada |
| 2010/0053349 A1 | 3/2010 | Watanabe et al. |
| 2010/0126831 A1 | 5/2010 | Ceelen |
| 2011/0090352 A1 | 4/2011 | Wang et al. |
| 2011/0102642 A1 | 5/2011 | Wang et al. |

FOREIGN PATENT DOCUMENTS

| | | |
|---|---|---|
| DE | 10107004 A1 | 9/2002 |
| EP | 0944251 A1 | 9/1999 |
| EP | 944251 B1 | 4/2003 |
| EP | 1583033 A2 | 10/2005 |
| EP | 1779322 B1 | 1/2008 |
| EP | 1429290 B1 | 7/2008 |
| JP | 10285542 A2 | 10/1998 |
| JP | 11327024 A2 | 11/1999 |
| WO | WO9843436 A1 | 10/1998 |
| WO | WO-9843436 A1 | 10/1998 |
| WO | WO0113171 A1 | 2/2001 |
| WO | WO-0245003 A1 | 6/2002 |
| WO | WO-03071484 A1 | 8/2003 |
| WO | WO-2004001667 A2 | 12/2003 |
| WO | WO-2004036378 A2 | 4/2004 |
| WO | WO-2006050782 A1 | 5/2006 |
| WO | WO2007093199 A2 | 8/2007 |
| WO | WO2007093199 A3 | 8/2007 |
| WO | WO2007142621 A1 | 12/2007 |
| WO | WO-2007143415 A2 | 12/2007 |
| WO | WO2008017343 A1 | 2/2008 |
| WO | WO2008131438 A2 | 10/2008 |
| WO | WO2008151802 A1 | 12/2008 |
| WO | WO2009036793 A1 | 3/2009 |

OTHER PUBLICATIONS

Xinqiao Liu, Photocurrent Estimation from Multiple Non-destructive Samples in a CMOS Image Sensor, SPIE 2001.*

Andrews, H.C. et al., "Digital Image Restoration", Prentice Hall, 1977.

Bates et al., "Some Implications of Zero Sheets for Blind Deconvolution and Phase Retrieval", J. Optical Soc. Am. A, 1990, pp. 468-479, vol. 7.

Ben Ezra, Moshe et al., "Motion Deblurring Using Hybrid Imaging", Proceedings IEEE Computer Society Conference on Computer Vision and Pattern Recognition, 2003.

Ben-Ezra, M. et al., "Motion-Based Motion Deblurring", IEEE Transactions on Pattern Analysis and Machine Intelligence, 2004, pp. 689-698, vol. 26—Issue 6.

Bennett, Eric P. et al., "Video Enhancement Using Per-Pixel Virtual Exposures", International Conference on Computer Graphics and Interactive Techniques, ACM Siggraph, 2005, pp. 845-852.

Bhaskaran, V. et al., "Motion estimation using a computation-constrained criterion", Digital Signal Processing Proceedings, 1997, pp. 229-232, vol. 1.

Bones et al., "Deconvolution and Phase Retrieval With Use of Zero Sheets", J. Optical Soc. Am. A, 1995, pp. 1,842-1,857, vol. 12.

Chen-Kuei Y. et al., "Color image sharpening by moment-preserving technique", Signal Processing, 1995, pp. 397-403, vol. 45—Issue 3, Elsevier Science Publishers.

Crowley, J. et al., "Multi-modal tracking of faces for video communication, http://citeseer.ist.psu.edu/crowley97multimodal.html", In Comp Vision and Patent Recognition, 1997.

Deever, A., "In-camera all-digital video stabilization", Proceedings of the International Conference on Decision Support Systems.Proceedings of ISDSS, 2006, pp. 190-193.

Demir, B. et al., "Block motion estimation using adaptive modified two-bit transform", 2007, pp. 215-222, vol. 1—Isuue 2.

Dufournaud et al., "Matching Images With Different Resolutions", IEEE Conference Proceedings on Computer Vision and Pattern Recognition, 2000.

Elad et al., "Restoration of a Single Superresolution Image from several Blurred, Noisy and Undersampled Measured Images", IEEE Trans on Image Processing, 1997. vol. 6—Issue 12.

Elad, Michael et al., "Superresolution Restoration of an Image Sequence: Adaptive Filtering Approach", IEEE Transactions on Image Processing, 1999, pp. 529-541, vol. 8—Issue 3.

Favaro, Paolo, "Depth from focus/defocus, http://homepages.inf.ed.ac.uk/rbf/Cvonline/LOCAL_COPIES/FAVAROI/dfdtutorial.html", 2002.

Feng, J. et al., "Adaptive block matching motion estimation algorithm using bit plane matching", ICIP, 1995, pp. 496-499.

Fujita K. et al., An edge-adaptive iterative method for image restoration, Singapore ICCS/ISITA '92."Communications on the Move" Singapore Nov. 16-20, 1992. New York, NY, USA. IEEE, US, Nov. 16, 1992.pp. 361-365, XP010066997, ISBN: 0-7803-0803-4.

Jansson, Peter A., "Chapter 1: Convolution and Related Concepts", Deconvolution of Images and Spectra, 1997, 2nd. Edition, Academic Press.

Jiang, Wei et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.

Ko, S. et al., "Fast digital image stabilizer based on gray-coded bit-plane matching", IEEE Transactions on Consumer Electronics, 1999, pp. 598-603, vol. 45—Issue 3.

Lane et al., "Automatic multidimensional deconvolution", J. Opt. Soc. Am. A, 1987, pp. 180-188, vol. 4—Issue 1.

Lhuillier, M. et al.. "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27—Issue 3, IEEE Comput. Soc.

Mase, Mitsuhito et al., "A Wide Dynamic Range CMOS image Sensor with Multiple Exposure-Time Signal Outputs and 12-bit Column-Parallel Cyclic A/D Converters", IEEE Journal of Solid-State Circuits, 2005, vol. 40—Issue 12.

(56) References Cited

OTHER PUBLICATIONS

Natarajan B. et al., "Low-complexity block-based motion estimation via one-bit transforms", IEEE Trans. Circuit Syst. Video Technol, 1997, pp. 702-706, vol. 7—Issue 5.
Oppenheim, A.V. et al., "The Importance of Phase in Signals, XP008060042, ISSN: 0018-9219.", Proceedings of the IEEE, 1981, pp. 529-541, vol. 69—Issue 5.
Park, Sung Cheol et al., "Super-resolution image reconstruction: a technical overview, ISSN: 1053-5888. DOI: 10.1109/MSP.2003. 1203207.", Signal Processing Magazine, 2003, pp. 21-36, vol. 20—Issue 3, IEEE Publication.
Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.
PCT International Preliminary Report on Patentability, for PCT Application No. PCT/EP2005/011011, dated Jan. 22, 2007, 8 pages.
PCT Notification of Transmittal of the International Search Report and the Written Opinion of the International Searching Authority, or the Declaration for PCT application No. PCT/US2007/069638, dated Mar. 5, 2008, 9 pages.
PCT Notification of Transmittal of the International Search Report and the Written Opinion of the International Searching Authority, or the Declaration, for PCT Application No. PCT/EP2005/011011, dated Apr. 24, 2006, 12 pages.
PCT Notification of Transmittal of the International Search Report and the Written Opinion of the International Searching Authority, or the Declaration, for PCT Application No. PCT/EP2007/009939. dated May 21, 2008, 13 pages.
PCT Notification of Transmittal of the International Search Report and the Written Opinion of the International Searching Authority, or the Declaration, for PCT Application No. PCT/EP2008/004729, dated Oct. 29, 2008. 9 pages.
Pulli, Kari et al., "Robust Meshes from Multiple Range Maps, http://citeseer.ist.psu.edu/pulli97robust.html", In Proc IEEE International Conference on Recent Advances in 3-D Digital Imaging and Modeling, 1997.
Rahgozar et al., "Motion Estimation Based on Time-Sequentially Sampled Imagery", IEEE Transactions on Image Processing, 1995.
Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.
Sasaki et al., "A Wide Dynamic Range CMOS Image Sensor with Multiple Short-Time Exposures", IEEE Proceedings on Sensors, 2004, pp. 967-972, vol. 2.
Sauer, K. et al., "Efficient Block Motion Estimation Using Integral Projections", IEEE Trans. Circuits, Systems for video Tech, 1996, pp. 513-518, vol. 6—Issue 5.
Schultz, Richard R. et al., "Extraction of High-Resolution Frames from Video Sequences, http://citeseer.ist.psu.edu/schultz96extraction.html", IEEE transactions on image processing, 1996, pp. 996-1011.
Seldin et al., "Iterative blind deconvolution algorithm applied to phase retrieval", J. Opt. Soc. Am. A, 1990, pp. 428-433, vol. 7—Issue 3.
She, Peng et al., "Motion View Reconstruction Method with Real Object Image based on Virtual Object Movement, http://rlinks2.dialog.com/NASApp/ChannelWEB/DialogProServlet?ChName=engineering", Eizo Joho Media Gakkai Gijutsu Hokoku, 2005, pp. 67-70, vol. 29—Issue 17.
Siu, Angus et al., "Image registration for image-based rendering, http://rlinks2.dialog.com/NASApp/ChannelWEB/DialogProServlet?ChName=engineering", IEEE Transactions on Image Processing , 2005, pp. 241-252, vol. 14—Issue 2.
Trussell, H.J. et al., "Identification and restoration of spatially variant motion blurs in sequential images, XP002375828", IEEE Transactions on Image Processing, 1992, pp. 123-126, vol. 1—Issue 1.
Uomori, K. et al., "Automatic image stabilizing system by fulldigital signal processing" IEEE Transactions on Consumer Electronics, 1990, vol. 36, No. 3, pp. 510-519.
Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.
Baker S., et al., Lucas Kanade 20 Years on: A Unifying Framework, International Journal of Computer Vision 2004, Springer Netherlands, 2004, vol. 56 (3), pp. 221-255.
Bhaskaran, V. et al., Motion estimation using a computation-constrained criterion, Digital Signal Processing Proceedings, 1997, pp. 229-232, vol. 1.
Cannon M., Blind Deconvolution of Spatially Invariant Image Blurs with Phase, IEEE Transactions on Acoustics, Speech, and Signal Processing, 1976, vol. ASSP-24, No. 1.
Internet Reference: CCD Fundamentals. Canon, URL:http//:www.roper.co.jp/Html/roper/tech_note/html/tefbin.htm, Nov. 2003.
Aaron Deever: In-camera all-digital video stabilization, Proceedings of the International Conference on Decision Support Systems. Proceedings of ISDSS, Jan. 1, 2006, pp. 190-193, XP009106923.
Demir, B. et al., Block motion estimation using adaptive modified two-bit transform, 2007, pp. 215-222, vol. 1, Issue 2.
Golub G. H. et al., Matrix Computations, 1996, 3rd edition, John Hopkins University Press, Baltimore.
Bahadir K. Gunturk, Murat Gevrekci, High-Resolution Image Reconstruction From Multiple Differently Exposed Images, IEEE Signal Processing Letters, vol. 13, No. 4, Apr. 2006, pp. 197-200.
Peter A. Jannson, Deconvolution of Images and Spectra, 1997, 2nd. Edition, Academic Press.
Kuglin C. D. et al., The phase correlation image alignment method, Proc. Int. Conf. Cybernetics and Society, 1975, pp. 163-165, IEEE, Bucharest, Romania.
Liu X., et al., Photocurrent Estimation from Multiple Non-Destructive Samples in a CMOS Image Sensor, in Proceedings of the SPIE Electronic Imaging 2001 Conference, vol. 4306, San Jose, CA, Jan. 2001, pp. 450-458.
Lyndsey Pickup, et al., Optimizing and Learning for Super-resolution, BMVC, Sep. 4-7, 2006.
Russ J.C., Chapter 3: Correcting Imaging Defects, in the Image Processing Handbook, 2002, by CRC Press, LLC., 75 pages.
Shi J., et al., Good Features to Track, IEEE Conference on Computer Vision and Patern Recognition, 1994, pp. 593-600.
Tomasi C., et al., Detection and Tracking of Point Features, Carnegie Mellon University Technical Report CMU-CS-91-132, Apr. 1991.
Trimeche M., et al., Multichannel Image Deblurring of Raw Color Components, Computational Imaging III., Edited by Bouman, Charles A., Miller, Eric L., Proceedings of the SPIE, vol. 5674, pp. 169-178, 2005.
Lu Yuan, et al., Image Deblurring with Blurred/Noisy Image Pairs, SIGGRAPH07, Aug. 5-9, 2007.
Barbara Zitova, et al., Image registration methods: a survey, Image and Vision Computing, 2003, pp. 977-1000, vol. 21.
PCT International Preliminary Report on Patentability, Chapter I, for PCT Application No. PCT/EP2009/008674, dated Jun. 14, 2011, 7 pages.
PCT International Preliminary Report on Patentability, Chapter I, for PCT Application No. PCT/US2007/069638, dated Dec. 10, 2008, 5 pages.
PCT International Preliminary Report on Patentability, Chapter I, for PCT Application No. PCT/EP2008/004729, dated Dec. 17, 2009, 10 pages.
PCT Notification of Transmittal of the International Search Report and the Written Opinion of the International Searching Authority, or the Declaration, for PCT Application No. PCT/EP2010/056999, dated Sep. 1, 2010, 10 pages.
PCT Notification of Transmittal of the International Search Report and the Written Opinion of the International Searching Authority, or the Declaration, for PCT Application No. PCT/EP2009/008674, dated Mar. 29, 2010, 10 pages.

(56) References Cited

OTHER PUBLICATIONS

PCT Notification of Transmittal of the International Search Report and the Written Opinion of the International Searching Authority, or the Declaration, for PCT Application No. PCT/EP2008/004729, dated Oct. 29, 2008, 14 pages.
PCT Written Opinion of the International Search Authority, for PCT Application No. PCT/EP2008/004729, dated Dec. 17, 2009, 9 pages.
Final Office Action mailed Nov. 17, 2011 for U.S. Appl. No. 12/901,577, filed Oct. 11, 2010.
Non-Final Office Action mailed Dec. 7, 2011 for U.S. Appl. No. 12/789,300, filed May 27, 2010.
Non-Final Office Action mailed Dec. 8, 2011 for U.S. Appl. No. 12/820,086, filed Jun. 21, 2010.
Non-Final Office Action mailed Dec. 8, 2011 for U.S. Appl. No. 12/820,034, filed Jun. 21, 2010.
Non-Final Office Action mailed Nov. 21, 2011 for U.S. Appl. No. 12/956,904, filed Nov. 30, 2010.
Notice of Allowance mailed Nov. 25, 2011 for U.S. Appl. No. 12/485,316, filed Jun. 16, 2009.

\* cited by examiner

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0.015 | 0 |
| 2 | 0 | 0 | 0 | 0 | 0 | 0 | 0.026 | 0.09 | 0.015 |
| 3 | 0 | 0 | 0 | 0 | 0 | 0.026 | 0.09 | 0.026 | 0 |
| 4 | 0 | 0 | 0 | 0 | 0.026 | 0.09 | 0.026 | 0 | 0 |
| 5 | 0 | 0 | 0 | 0.026 | 0.09 | 0.026 | 0 | 0 | 0 |
| 6 | 0 | 0 | 0.026 | 0.09 | 0.026 | 0 | 0 | 0 | 0 |
| 7 | 0 | 0.026 | 0.09 | 0.026 | 0 | 0 | 0 | 0 | 0 |
| 8 | 0.015 | 0.09 | 0.026 | 0 | 0 | 0 | 0 | 0 | 0 |
| 9 | 0 | 0.015 | 0 | 0 | 0 | 0 | 0 | 0 | 0 |

FIG. 9a

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0.015 | 0 |
| 2 | 0 | 0 | 0 | 0 | 0 | 0 | 0.026 | 0.3 | 0.015 |
| 3 | 0 | 0 | 0 | 0 | 0 | 0.026 | 0.09 | 0.026 | 0 |
| 4 | 0 | 0 | 0 | 0 | 0.026 | 0.09 | 0.026 | 0 | 0 |
| 5 | 0 | 0 | 0 | 0.026 | 0.09 | 0.026 | 0 | 0 | 0 |
| 6 | 0 | 0 | 0.026 | 0.09 | 0.026 | 0 | 0 | 0 | 0 |
| 7 | 0 | 0.026 | 0.09 | 0.026 | 0 | 0 | 0 | 0 | 0 |
| 8 | 0.015 | 0.09 | 0.026 | 0 | 0 | 0 | 0 | 0 | 0 |
| 9 | 0 | 0.015 | 0 | 0 | 0 | 0 | 0 | 0 | 0 |

FIG. 9b

IMAGE PROCESSING METHOD AND APPARATUS

CROSS REFERENCE TO RELATED APPLICATIONS

This application claims priority to U.S. provisional patent application Ser. No. 61/023,774, filed Jan. 25, 2008, and is a continuation-in-part of U.S. patent application Ser. No. 11/856,721, filed Sep. 18, 2007, and is a continuation-in-part of U.S. patent application Ser. No. 12/116,140, filed May 6, 2008, now U.S. Pat. No. 7,995,855. Each of these is assigned to the same assignee and is hereby incorporated by reference.

BACKGROUND

1. Field of the Invention

The present invention relates to an image processing method and apparatus, and particularly to combining sharp and blurred images of different resolution and exposure to produce a relatively high resolution, fully exposed and relatively sharp image.

2. Description of the Related Art

Two source images nominally of the same scene may be used to produce a single target image of better quality or higher resolution than either of the source images.

In super-resolution, multiple differently exposed lower resolution images can be combined to produce a single high resolution image of a scene, for example, see "High-Resolution Image Reconstruction from Multiple Differently Exposed Images", Gunturk et al., IEEE Signal Processing Letters, Vol. 13, No. 4, April 2006; or "Optimizing and Learning for Super-resolution", Lyndsey Pickup et al, BMVC 2006, 4-7 Sep. 2006, Edinburgh, UK, each being incorporated by reference. However, in super-resolution, blurring of the individual source images either because of camera or subject motion are usually not of concern before the combination of the source images.

U.S. Pat. No. 7,072,525, incorporated by reference, discloses adaptive filtering of a target version of an image that has been produced by processing an original version of the image to mitigate the effects of processing including adaptive gain noise, up-sampling artifacts or compression artifacts.

PCT Application No. PCT/EP2005/011011 and U.S. Ser. No. 10/985,657, incorporated by reference, discloses using information from one or more presumed-sharp short exposure time (SET) preview images to calculate a motion function for a fully exposed higher resolution main image to assist in the de-blurring of the main image.

Indeed many other documents, including US 2006/0187308, Suk Hwan Lim et al.; and "Image Deblurring with Blurred/Noisy Image Pairs", Lu Yuan et al, SIGGRAPH07, Aug. 5-9, 2007, San Diego, Calif., incorporated by reference, are directed towards attempting to calculate a blur function in the main image using a second reference image before de-blurring the main image.

Other approaches, such as disclosed in US2006/0017837, incorporated by reference, have involved selecting information from two or more images, having varying exposure times, to reconstruct a target image where image information is selected from zones with high image details in SET images and from zones with low image details in longer exposure time images.

It is desired to provide an improved method of combining a sharp image and a blurred image of differing resolution and exposure to produce a relatively high resolution, fully exposed and relatively sharp image.

SUMMARY OF THE INVENTION

An image processing method is provided to process a first relatively underexposed and sharp image of a scene, and a second relatively well exposed and blurred image nominally of the same scene. The first and second images are derived from respective image sources. A portion of a relatively first underexposed image is provided as an input signal to an adaptive filter. A corresponding portion of the second relatively well exposed image is provided as a desired signal to the adaptive filter. An output signal is provided from the input signal and the desired signal. A first filtered image is constructed from the output signal that is relatively less blurred than the second image. The first filtered image or a further processed version is displayed, transmitted, projected and/or stored.

The first and second images may be in YCC format. The image portions may include a respective Y plane of the first and second images. The constructing the first filtered image may include using the output signal as a Y plane of the first filtered image and using Cb and Cr planes of the input image as the Cb and Cr planes of the first filtered image.

The image source for the second image may be of a relatively higher resolution than the image source for the first image. The method may include aligning and interpolating the first image source to match the alignment and resolution of the second image source.

The first image may be one of an image acquired soon before or after the second image.

The image source for the second image may be of a relatively lower resolution than the image source for the first image. The method may include aligning and interpolating the second source to match the alignment and resolution of the first source. Responsive to the first and second sources being misaligned by more than a pre-determined threshold, the method may further include providing the desired signal from a linear combination of first and second image sources or from a combination of phase values from one of the first and second image sources and amplitude values for the other of the first and second image sources.

The method may include noise filtering the first filtered image and/or applying color correction to one of the first filtered image or the noise filtered image.

The method may include acquiring a first partially exposed image from an image sensor, acquiring a second further exposed image from the image sensor, and subsequently resetting the image sensor. The obtaining the first relatively underexposed and sharp image of a scene may include subtracting the first partially exposed image from the second further exposed image. The second relatively well exposed and blurred image may be obtained from the image sensor immediately prior to the resetting.

A further image processing method is provided. A first relatively underexposed and sharp image of a scene is obtained. A second relatively well exposed and blurred image, nominally of the same scene, is also obtained, wherein the first and second images are derived from respective image sources. A portion of the relatively first underexposed image is provided as an input signal to an adaptive filter. A corresponding portion of the second relatively well exposed image is provided as a desired signal to the adaptive filter. The input signal is adaptively filtered to produce an output signal. A first filtered image is constructed from the output signal, and is relatively less blurred than the second image. The first filtered image and/or a processed version is/are displayed, transmitted, projected and/or stored.

The method may include providing a portion of the first filtered image as the input signal to an adaptive filter, providing a corresponding portion of the second image as a desired signal to the adaptive filter, further adaptively filtering the input signal to produce a further output signal, and constructing a further filtered image from the further output signal relatively less blurred than the first filtered image.

The first and second images may be in RGB format and may be used to produce the first filtered image. The image portions may include a respective color plane of the first and second images. The providing of a portion of the first filtered image may include converting the first filtered image to YCC format. The method may also include converting the second image to YCC format. The image portions for further adaptive filtering may include a respective Y plane of said converted images.

The first and second images may be in YCC format and may be used to produce the first filtered image. The image portions may include a respective Y plane of the first and second images. The providing of a portion of the first filtered image may include converting the first filtered image to RGB format. The method may include converting the second image to RGB format. The image portions for further adaptive filtering may include a respective color plane of the converted images.

The adaptive filtering may be performed one of row or column wise on said input signal and wherein further adaptively filtering is performed on the other of row or column wise on said input signal.

The method may include noise filtering the first filtered image and/or applying color correction to the first filtered image and/or the noise filtered image.

The first and second images may be in RGB format. The image portions may include a respective color plane of the first and second images. The adaptive filtering includes producing a set of filter coefficients from a combination of said input signal and a error signal being the difference between said desired signal and said output signal; and wherein the method further comprises constructing each color plane of said first filtered image from a combination of said filter coefficients and said input signal color plane information.

Prior to adaptive filtering, a point spread function, PSF, is estimated for the second image. The second image is de-blurred with the point spread function. The de-blurring may be performed in response to the PSF being less than a predetermined threshold.

The method may include amplifying the luminance characteristics of the under exposed image prior to the adaptive filtering.

An image processing apparatus is further provided to process a first relatively underexposed and sharp image of a scene, as well as a second relatively well exposed and blurred image, nominally of the same scene. The first and second images are derived from respective image sources. The apparatus includes processor-based components to provide a portion of the relatively first underexposed image as an input signal to an adaptive filter and to provide a corresponding portion of the second relatively well exposed image as a desired signal to the adaptive filter. The apparatus also includes an adaptive filter arranged to produce an output signal from the input signal and the desired signal. An image generator of the apparatus is arranged to construct a first filtered image from the output signal, which is relatively less blurred than the second image.

One or more processor-readable media are also provided having embedded therein processor-readable code for programming a processor to perform any of the image processing methods described herein.

A portable digital image acquisition device is also provided. The device includes a lens and image sensor for capturing a digital image, and a processor, and one or more processor-readable media having processor-readable code embedded therein for programming the processor to perform any of the image processing methods described herein.

BRIEF DESCRIPTION OF THE DRAWINGS

Embodiments of the invention will now be described, by way of example, with reference to the accompanying drawings, in which:

FIGS. 9(a)-(e) illustrate some image data produced during the image acquisition illustrated at FIG. 8.

DETAILED DESCRIPTION OF THE EMBODIMENTS

Figure 1:
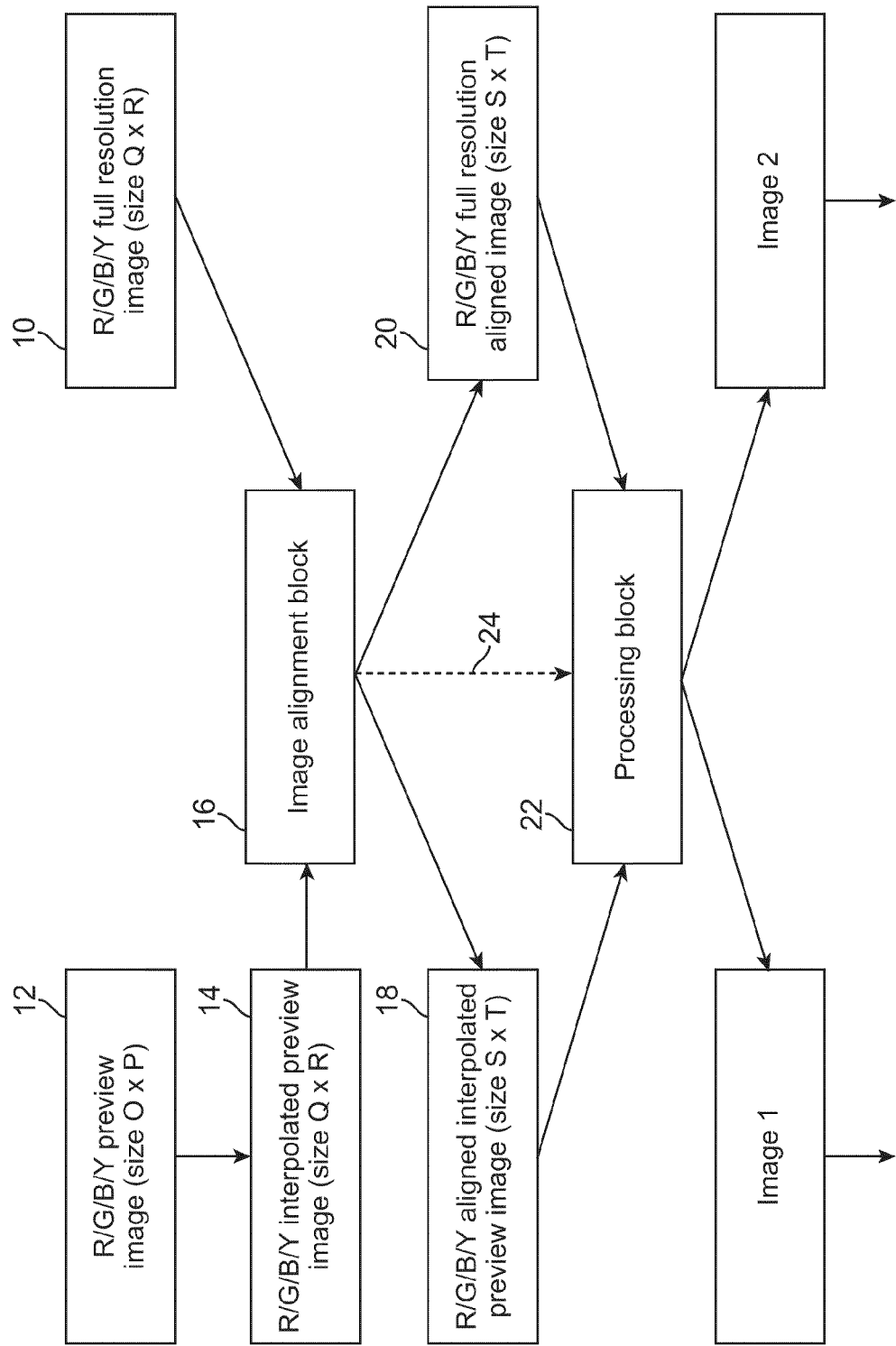
FIG. 1 is a block diagram illustrating the processing of images prior to adaptive filtering in accordance with certain embodiments.

Embodiments are described to provide an image processing method and apparatus is arranged to process a first relatively underexposed and sharp image of a scene, and a second relatively well exposed and blurred image, nominally of the same scene, the first and second images being derived from respective image sources. The apparatus provides a portion of the relatively first underexposed image as an input signal to an adaptive filter; and a corresponding portion of the second relatively well exposed image as a desired signal to the adaptive filter.

Embodiments are also described to provide an image processing apparatus is arranged to process a first relatively underexposed and sharp image of a scene, and a second relatively well exposed and blurred image, nominally of the same scene, the first and second images being derived from respective image sources. The apparatus provides a portion of the relatively first underexposed image as an input signal to an adaptive filter; and a corresponding portion of the second relatively well exposed image as a desired signal to the adaptive filter. The adaptive filter produces an output signal from the input signal and the desired signal; and an image generator constructs a first filtered image from the output signal, relatively less blurred than the second image.

Embodiments further provide image enhancement methods and systems. In accordance with one embodiment, there is no need to perform image registration between picture pair, linear regression or gamma correction. The method shows robustness to image content differences and low quality previews. Also, the method can be easily applied to create video frames from the under-exposed and well exposed frame pair. For one such embodiment, implementation complexity is reduced and the resultant technique is robust in finite precision implementations. The method shows robustness to image content differences and low quality previews.

In this description, numerous specific details are set forth. However, it is understood that embodiments of the invention may be practiced without these specific details. In other instances, well-known, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" or "in certain embodiments" in various places throughout the specification are not necessarily all referring to the same embodiment or embodiments. Furthermore, the particular features, structures, or characteristics may be combined in any suitable manner in one or more embodiments.

Moreover, inventive aspects lie in less than all features of a single disclosed embodiment. Thus, any claims following the Detailed Description are hereby expressly incorporated into this Detailed Description, with each claim standing on its own as a separate embodiment of this invention.

Embodiments of the invention are applicable in a variety of settings in which image enhancement is effected. For one embodiment of the invention, during the acquisition step, the camera will acquire two images (one full-resolution under-exposed image and a well exposed blurred image (can be a preview or another full resolution image).

Referring now to FIG. 1, in a first embodiment, a well-exposed blurred relatively low resolution image 12 and a sharp but under-exposed full resolution image 10 are available for processing with a view to combining the images to produce an improved quality full resolution image.

The size of the lower resolution image 12 is OxP and the size of the under-exposed full resolution image 10 is QxR, with O<Q and P<R.

Where the images are acquired in a digital image acquisition device such as a digital stills camera, camera phone or digital video camera, the lower resolution image 12 may be a preview image of a scene acquired soon before or after the acquisition of a main image comprising the full resolution image 10, with the dimensions of the preview and full resolution images depending on the camera type and settings. For example, the preview size can be 320×240 (O=320; P=240) and the full resolution image can be much bigger (e.g. Q=3648; R=2736).

In accordance with certain embodiments, adaptive filtering (described in more detail later) is applied to the (possibly pre-processed) source images 10, 12 to produce an improved filtered image. Adaptive filtering requires an input image (referred to in the present specification as x(k)) and a desired image (referred to in the present specification as d(k)) of the same size, with the resultant filtered image (referred to in the present specification as y(k)) having the same size as both input and desired images.

As such, in an embodiment, the preview image is interpolated to the size QxR of the full resolution image.

In interpolating the preview image, a misalignment between the interpolated image 14 and the full resolution image might exist. As such, in an embodiment, the images are aligned 16 to produce an aligned interpolated preview image 18 and an aligned full resolution image 20. Any known image alignment procedure can be used, for example, as described in Kuglin C D., Hines D C. "The phase correlation image alignment method", Proc. Int. Conf Cybernetics and Society, IEEE, Bucharest, Romania, September 1975, pp. 163-165, incorporated by reference.

Other possible image registration methods are surveyed in "Image registration methods: a survey", Image and Vision Computing 21 (2003), 977-1000, Barbara Zitova and Jan Flusser, incorporated by reference.

Alternatively, the displacements between the images 10 and 12/14 can be measured if camera sensors producing such a measure are made available.

In any case, either before or during alignment, the full resolution image can be down-sampled to an intermediate size SxT with the preview image being interpolated accordingly to produce the input and desired images of the required resolution, so that after alignment 16, the size of the aligned interpolated image and the aligned full resolution image will be SxT (S≤Q,T≤R).

These images are now subjected to further processing 22 to compute the input and desired images (IMAGE 1 and IMAGE 2) to be used in adaptive filtering after a decision is made based on the displacement value(s) provided from image alignment 16 as indicated by the line 24.

In real situations, there may be relatively large differences between the images 10, 14, with one image being severely blurred and the other one being under-exposed. As such, alignment may fail to give the right displacement between images.

If the displacement values are lower than a specified number of pixels (e.g. 20), then the full resolution aligned image 20 is used as IMAGE 1 and the aligned interpolated preview image 18 is used as IMAGE 2.

Otherwise, if the displacement values are higher than the specified number of pixels, several alternatives are possible for IMAGE 2, although in general these involve obtaining IMAGE 2 by combining the interpolated preview image 14 and the full resolution image 10 in one of a number of manners.

In a first implementation, we compute two coefficients $c_1$ and $c_2$ and the pixel values of IMAGE 2 are obtained by multiplying the pixel values of the full resolution image 10 with $c_1$ and adding $c_2$. These coefficients are computed using a linear regression and a common form of linear regression is least square fitting (G. H. Golub and C. F. Van Loan, Matrix Computations. John Hopkins University Press, Baltimore, Md., 3rd edition, 1996), incorporated by reference.

Figure 2:
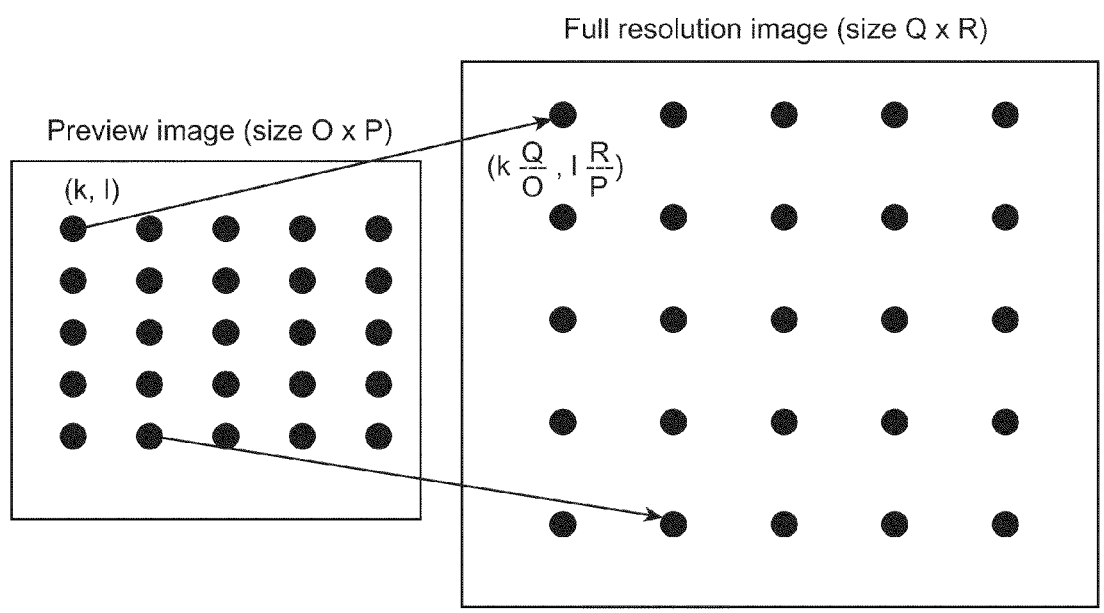
FIG. 2 illustrates corresponding grid points from a preview and a full resolution image used in the processing of FIG. 1.

Referring to FIG. 2, a grid comprising for example 25 points is chosen from the preview image 12 and the corresponding 25 grid points from the full resolution image 10. If one pixel of the preview image has the coordinates (k, l), the corresponding chosen pixel from the full resolution image has the coordinates $$\left(\left(k \cdot \frac{Q}{O}, l \cdot \frac{R}{P}\right)\right).$$

Therefore we obtain two 5×5 matrices, $M_1$ that corresponds to the pixel values chosen from the preview image and $M_2$ that corresponds to the pixel values chosen from the full resolution image. Two vectors are obtained from the pixel values of these matrices by column-wise ordering of $M_1(a=(a_1)$ and $M_2b=(b_i))$. We therefore have pairs of data $(a_i,b_i)$ for i=1, 2, . . . , n, where n=25 is the total number of grid points from each image. We define the matrix $$V = \begin{pmatrix} a_1 1 \\ a_2 1 \\ \vdots \\ a_n 1 \end{pmatrix}.$$

The coefficient vector $c=[c_1 c_2]$ is obtained by solving the linear system $V^T V c = V^T b$. The linear system can be solved with any known method.

Another alternative is to amplify the pixels of the under-exposed image 10 with the ratio of average values of the 25 grid points of both images 10, 12 and rescale within the [0-255] interval for use as IMAGE 2.

In a still further alternative, IMAGE 2 is obtained by combining the amplitude spectrum of the interpolated blurred preview image 14 and the phase of the under-exposed full resolution image 10. As such, IMAGE 2 will be slightly deblurred, with some color artifacts, although it will be aligned with the under-exposed image 10. This should produce relatively fewer artifacts in the final image produced by adaptive filtering.

Alternatively, instead of computing FFTs on full resolution images to determine phase values, an intermediate image at preview resolution can be computed by combining the amplitude spectrum of the blurred image 12 and the phase of a reduced sized version of the under-exposed image 10. This can then be interpolated to produce IMAGE 2.

Another possibility is to use as IMAGE 2, a weighted combination of image 20 and image 18, e.g. 0.1*(Image 18)+0.9*(Image 20). This can be used if the preview image 12 has large saturated areas.

Figure 3:
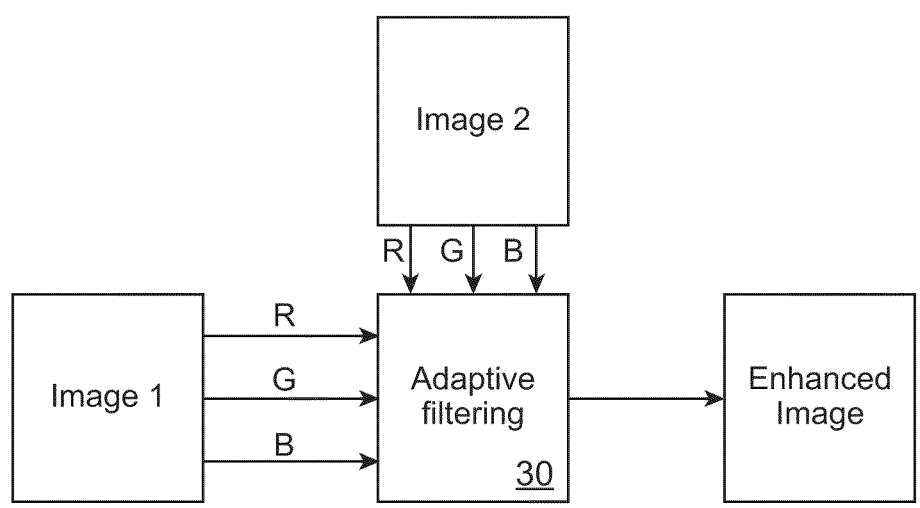
FIG. 3 illustrates adaptive filtering of images in R/G/B color space in accordance with certain embodiments.
Figure 4:
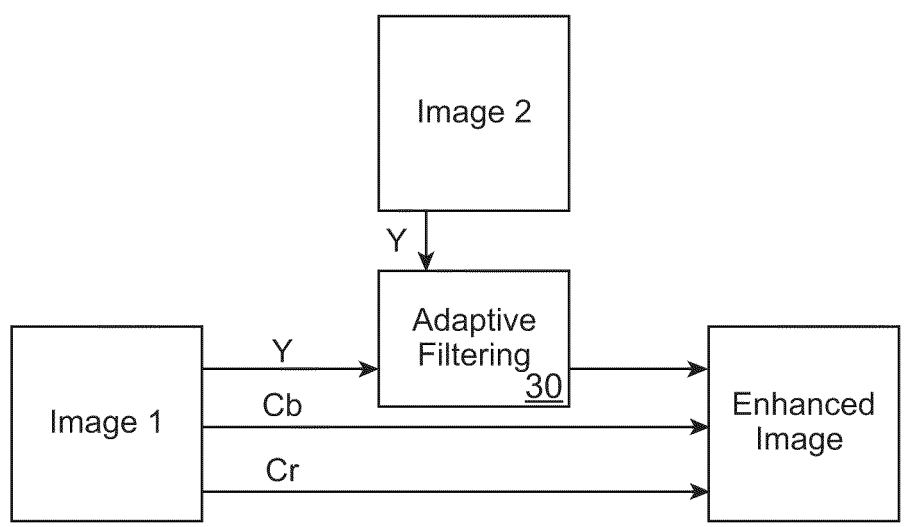
FIG. 4 illustrates adaptive filtering of images in YCbCr color space in accordance with certain embodiments.

In any case, once the processing 22 is complete, two images of similar size are available for adaptive filtering 30, as illustrated at FIGS. 3-4.

In a first implementation, the input and desired images are in RGB color space, e.g., see FIG. 3, whereas in another implementation the input and desired images are in YCC space, e.g., see FIG. 4. For the RGB case, one color plane (e.g. G plane) is selected from both images and the computed filter coefficients from adaptive filtering are used to update the pixel values for all color planes. The filter coefficients w(k) are obtained at each iteration of the filter 36. The updated pixel value for all color planes will be $y_G(k)=w(k) \cdot x_G(k)$, $y_R(k)=w(k) \cdot x_R(k)$, $y_B(k)=w(k) \cdot x_B(k)$, where $x_R(k)$, $x_G(k)$, $x_B(k)$ are the sliding vectors 32 for the R,G,B planes respectively. This provides a solution of reduced numerical complexity vis-à-vis filtering all three color planes.

In the YCC case, the Y plane is selected with the Cb and Cr planes being left unchanged.

Figure 5A:
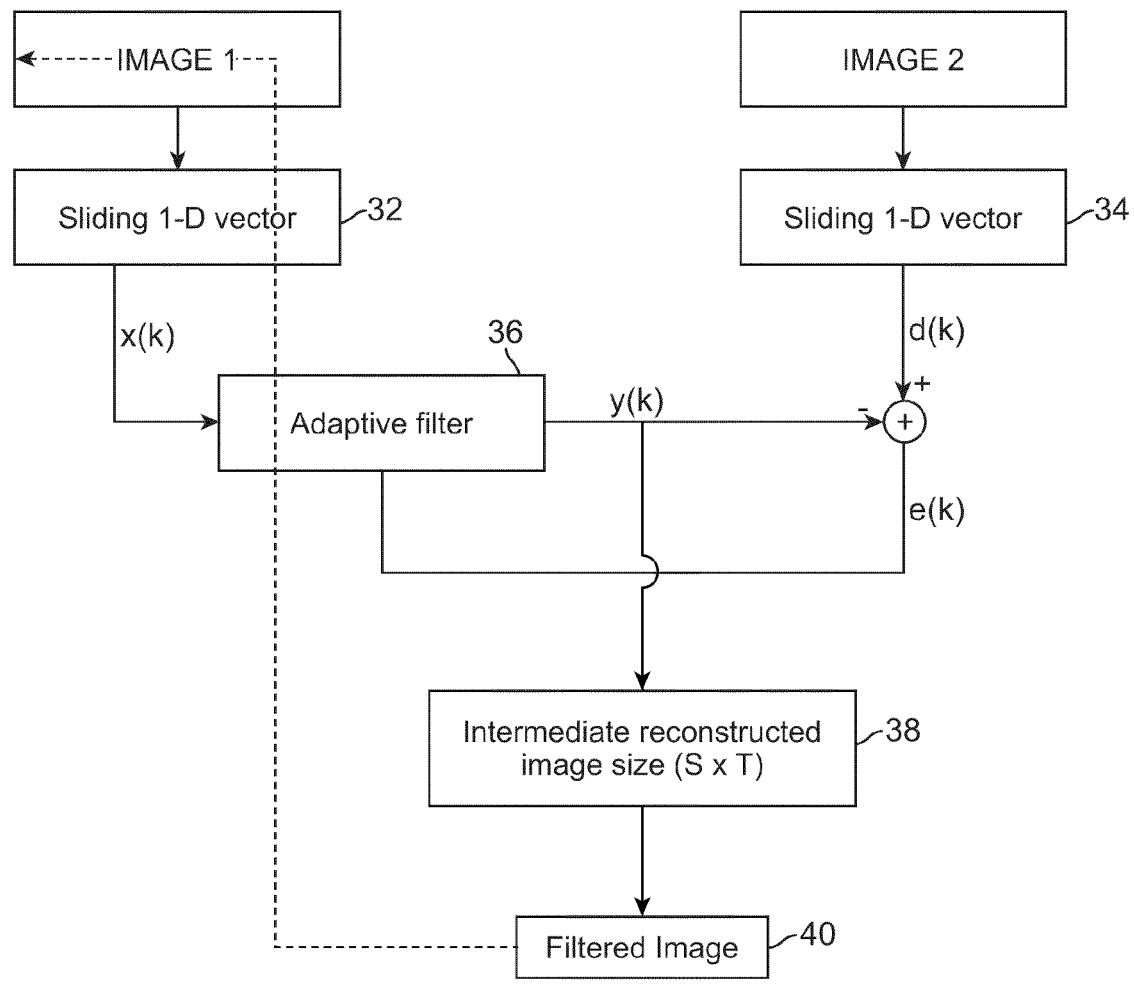
FIGS. 5(a) and 5(b) illustrate adaptive filtering of images in accordance with certain embodiments.

Referring now to FIG. 5(a), where the adaptive filtering of FIGS. 3 and 4 is shown in more detail. Two sliding one-dimensional vectors 32, 34 with the dimension L are created, L being the length of the adaptive filter. Within the adaptive filter, the input signal x(k) is the first vector signal 32, while the desired signal d(k) is second vector 34.

In the simplest implementation, L=1 and this can be used if the original image acquisition device can provide good quality under-exposed pictures with a low exposure time. Where the acquisition device produces low quality and noisy under-exposed images, a longer filter length L should be chosen (e.g. 2 or 3 coefficients).

Figure 6:
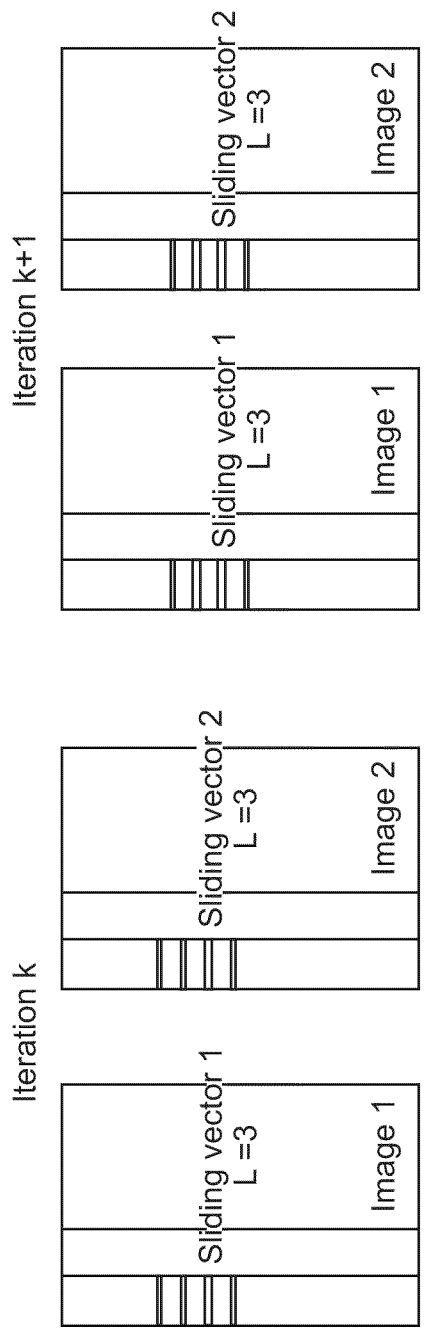
FIG. 6 illustrates an example of a sliding vector employed in the filtering of FIGS. 5(a)-(b) at successive iterations for L=3.

The sliding vectors 32, 34 are obtained from the columns of the image matrices, as illustrated at FIG. 6. The vectors scan both matrices, column by column, and with each iteration of the adaptive filter, the following pixel value is added to the vector and the trailing pixel value is discarded.

When the vectors 32, 34 are combined in the adaptive filter 36, the most recent pixel value added to the first sliding vector 32 is updated. In the preferred embodiment, the updated pixel is the dot product of the filter coefficients and the L pixel values of the first vector. Many variations of adaptive algorithms (e.g., Least Mean Square based, Recursive Least Square based) can be applied and many such algorithms can be found for example in S. Haykin, "Adaptive filter theory", Prentice Hall, 1996, incorporated by reference. Preferably, the sign-data LMS is employed as described in Hayes, M, Statistical Digital Signal Processing and Modeling, New York, Wiley, 1996, incorporated by reference.

The formulae are:

$$x(k)=[x(k),x(k-1) \ldots x(k-L+1)],$$

$$w(k)=[w(k),w(k-1) \ldots w(k-L+1)],$$

$$y(k)=w(k) \cdot x(k),$$

$$e(k)=d(k)-y(k),$$

$$w(k+1)=w(k)+\mu(k) \cdot e(k) \cdot \text{sign}(x(k))=w(k)+\mu(k) \cdot e(k),$$

where
w(k) are the filter coefficients calculated within the filter 36,
p(k) is the step size (fixed or variable),
x(k) is the most recent pixel value(s) of the sliding vector 32 from Image 1 (it has always positive values),
d(k) is the most recent pixel value(s) of the sliding vector 34 from Image 2,
y(k) is the scalar product of the sliding vector 32 and the filter coefficients vector w,
e(k) is the error signal computed as the difference between d(k) and y(k).

Other considered variants were:

$$w(k+1)=w(k)+\mu(k) \cdot e(k) \cdot x(k) \text{ (standard LMS) or}$$

$$w(k+1)=w(k)+\mu(k) \cdot e(k)/(1+x(k))$$

The term 1+x(k) is used above to avoid the division by zero. Alternatively, the formula:

$$w(k+1) = w(k) + \mu(k) \cdot \frac{e(k)}{x(k)}$$

could be used, with any zero-valued x pixel value replaced with a 1.

In a further variant, the step size μ(k) is variable as follows:

$$\mu(k) = \frac{1-\alpha}{x(k)}$$

or $$\mu(k) = \frac{1-\alpha}{\max(\beta, x(k))}.$$

So, using the above formula:

$$w(k+1)=w(k)+\mu(k)\cdot e(k)\cdot \text{sign}(x(k))=w(k)+\mu(k)\cdot e(k)$$

this gives:

$$w(k) + \frac{1-\alpha}{x(k)}(d(k) - w(k)\cdot x(k)) = w(k) + \frac{d(k)}{x(k)} - w(k) - \alpha \cdot \frac{d(k)}{x(k)} + \alpha \cdot w(k)$$

$$= \alpha \cdot w(k) + (1-\alpha) \cdot \frac{d(k)}{x(k)}$$

If μ(k)=μ=1−α, α very close to 1 (e.g. 0.99999), for L=1, we have $$w(k+1) = w(k) + \mu(k) \cdot \frac{e(k)}{x(k)},$$

with vectors being replaced with scalars. Therefore, for this particular fixed step size, the sign-data LMS and the previous equation are equivalent.

The β parameter can be used in order to avoid division by zero and to over-amplify any black pixels. β is preferably in the interval [1 . . . 10], and preferably in the interval [5 . . . 10], particularly if the under-exposed image is too dark. If not, β=1 is enough.

Some thresholds or resetting for the filter coefficients w(k) or output values y(k) can be imposed in order to avoid artifacts in the filtered image 38. An upper threshold, δ is imposed for the values that can be allowed for the coefficients of w(k) (i.e. $w_i(k)=\delta$ for any i=1 . . . L, if its computed value at iteration k is above δ). A suitable threshold value for the mentioned LMS algorithm, can be chosen as $$\delta = 1 + \frac{\bar{b}}{4 \cdot \bar{a}},$$

where $\bar{b}$ and $\bar{a}$ the average values of above mentioned vectors b and a respectively. Also, the filter output can be forced to be within the [0 255] interval if uint8 images are used. As can be seen, the updated pixel values y(k) replace the old pixel values x(k) and can be taken into account for the next sliding vectors.

The updated color matrix 38 is completed when the last pixel from the last column has been updated. If filtering has been performed in RGB space, then a final reconstructed image 40 is obtained by concatenating the R/G/B updated matrices. Alternatively, if filtering has been performed in YCC space, the concatenated updated Y plane, i.e. matrix 38, with unchanged Cb and Cr planes of the under-exposed image 10 can be converted back to RGB color space.

The filtering can be repeated with the reconstructed image 40 replacing the under-exposed image, i.e. IMAGE 1.

In this case, adaptive filtering can be performed on the Y plane of an image converted from RGB space, if previous filtering had been performed in RGB space; or alternatively filtering can be performed on an RGB color plane of an image converted from YCC space, if previous filtering had been performed on the Y plane.

It will also be seen that filtering can be operated column wise or row wise. As such, adaptive filtering can be performed first column or row wise and subsequently in the other of column or row wise.

In each case where filtering is repeated, it has been found that the quality of the reconstructed image after two filtering operations is superior than for each individual filtering result.

Figure 5B:
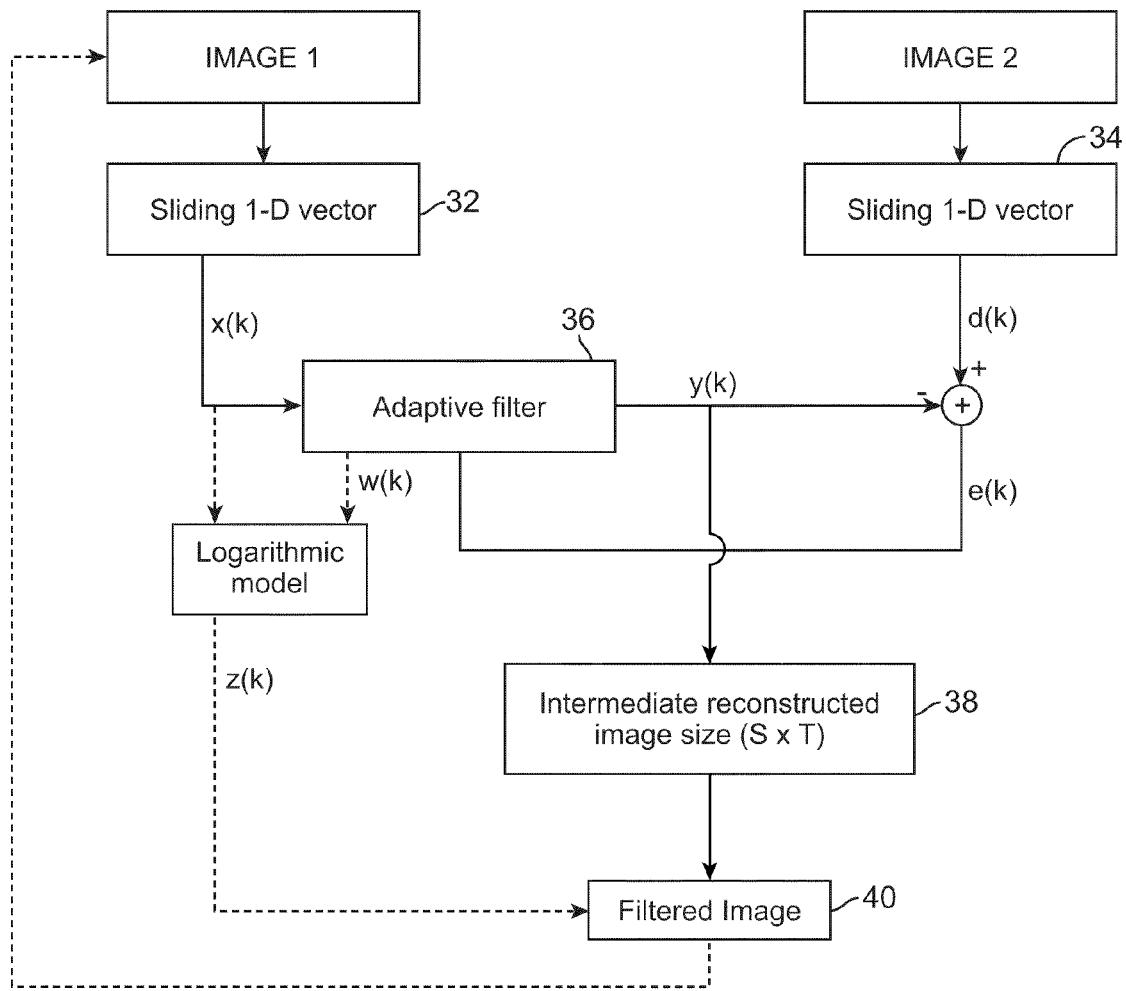

Referring to FIG. 5(b), in some cases saturation problems might appear in the filtered image, especially when the coefficient $c_1$ has a large value (e.g. when using a very dark under-exposed image and very light blurred image). This saturation can be avoided using, for example, techniques described in Jourlin, M., Pinoli, J. C.: "Logarithmic image processing. the mathematical and physical framework for the representation and processing of transmitted images" Advances in Imaging and Electron Physics 115 (2001) 129-196; or Deng, G., Cahill, L. W., Tobin, G. R.: "The study of logarithmic image processing model and its application to image enhancement". IEEE Trans. on Image Processing 4 (1995) 506-512, each incorporated by reference.

Therefore, the pixel value of the filtered image z(k) is generated by the following formula:

$$z(k) = D - D\left(1 - \frac{x(k)}{D}\right)^{w(k)}$$

where D is the maximum permitted value (e.g. 255 for a 8 bit representation of images). The adaptive filter provides the first filter coefficient w(k) computed using the error signal e(k). Another alternative to reduce saturation problems is to reduce the value of the step size μ(k).

Figure 7:
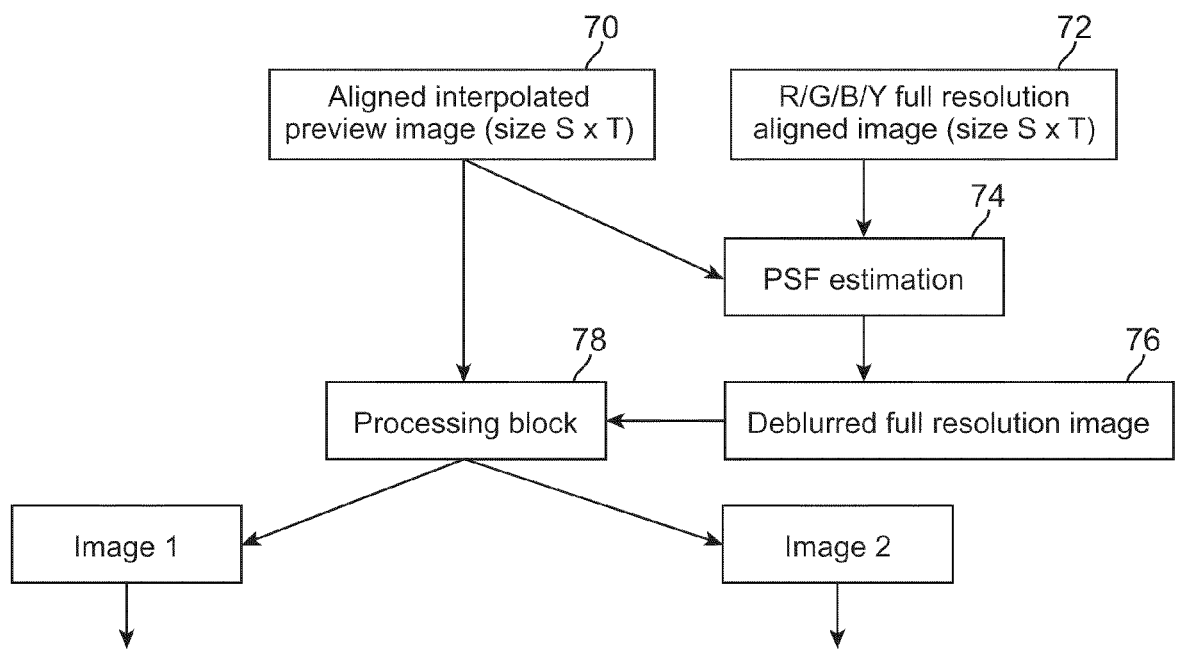
FIG. 7 is a block diagram illustrating processing of images prior to adaptive filtering in accordance with certain embodiments.

Referring now to FIG. 7, in a second embodiment, an under-exposed relatively-sharp low resolution image and a full resolution blurred image 72 are available. The low resolution image, for example, a preview image as before, is interpolated and aligned with the full resolution image to produce image 70.

A PSF estimation block 74 computes a PSF for the blurred image 72, from the interpolated preview 70 and the full resolution image 72, using any suitable method such as outlined in the introduction.

The blurred 72 image is then deblurred using this estimated PSF to produce a relatively deblurred image 76. Examples of deblurring using a PSF are disclosed in "Deconvolution of Images and Spectra" 2nd. Edition, Academic Press, 1997, edited by Jannson, Peter A. and "Digital Image Restoration", Prentice Hall, 1977 authored by Andrews, H. C. and Hunt, B. R., incorporated by reference.

Prior to adaptive filtering, the average luminance of the interpolated preview image 70 is equalized in processing block 78 with that of the full resolution (relatively) deblurred image 76. Preferably, this comprises a gamma (γ) amplification of the under-exposed image. The exact value of gamma is determined by obtaining a ratio of average luminance ($\bar{Y}$ in YCC format) for the blurred full resolution and the preview image, and then using this ratio as an index for a look-up table to return γ. The deblurred full resolution image 76 is then chosen as IMAGE 2 and the interpolated/aligned/luminance equalized preview image produced by the processing block 78 is chosen as IMAGE 1.

Adaptive filtering is then applied and re-applied if necessary to IMAGE 1 and IMAGE 2 as in the first embodiment. Again when repeating adaptive filtering, the under-exposed image, i.e. IMAGE 1 is replaced with the reconstructed one.

In the second embodiment, the quality of the reconstructed image 76 produced by adaptive filtering may not be good enough, especially if the PSF is relatively large. In such cases, de-blurring using the PSF may not be used, because can it introduce significant ringing.

In cases such as this, re-applying adaptive filtering as in the first embodiment can attenuate the blurring artifacts in the original image 72 and improve the quality of the image to some extent.

Again, the adaptive filtering can be performed on Y plane if RGB filtering had been performed previously and on the RGB color space if Y filtering had been performed previously.

Again, filtering can be operated on columns or rows, and sequentially on columns and rows.

It has also been found that the second embodiment is useful, if the ratio between the full resolution image 72 and the preview image sizes is less than three and the preview image is not too noisy. If this is not the case, the filtered image can have a lower quality than that obtained by de-blurring the blurred image with a very good PSF estimation such as described in the introduction.

In both of the first and second embodiments, a single preview image is described as being interpolated to match the resolution of the full resolution image. However, it will also be appreciated that super-resolution of more than 1 preview image, nominally of the same scene, could also be used to generate the interpolated images 14, 70 of the first and second embodiments, and/or one or more post-view images may be used, and/or another reference image may be used having a partially or wholly overlapping exposure period. Thus, wherever "preview image" is mentioned herein, it is meant to include post-view and overlapping images.

In the above embodiments and in particular in relation to the second embodiment, the short-exposure time (presumed sharp) image is described as comprising a preview image acquired either soon before or after acquisition of a main high resolution image.

However, in a further refined embodiment, the two images are acquired within the longer time period of acquisition of the relatively blurred image. In an implementation of this embodiment, an image acquisition device including a CMOS sensor which allows for a non-destructive readout of an image sensor during image acquisition is employed to acquire the images.

Figure 8:
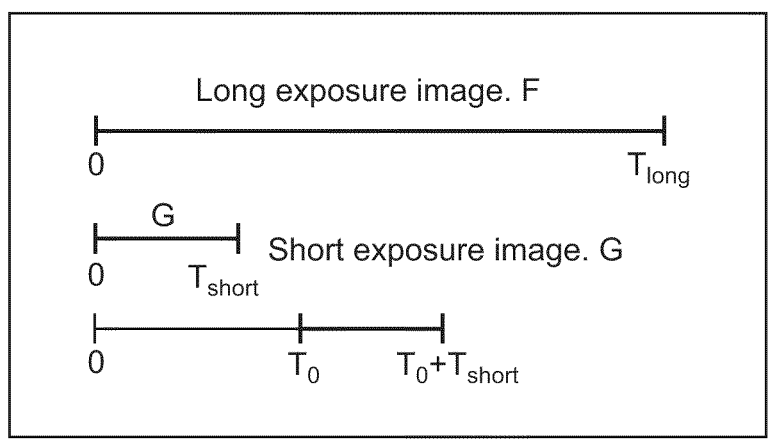
FIG. 8 illustrates timing involved in acquiring two images in accordance with certain embodiments.

A schematic representation of the timing involved in acquiring these images is explained in relation to FIG. 8. For a dark scene, the exposure time $T_{long}$ required to expose the image F properly can result in motion blur caused by hand jitter. Nonetheless, using a non-destructive sensor, it is possible to have an intermediate reading at $T_{short}$ providing an under-exposed (noise prone), but sharp image G.

In certain embodiments, the read-out of the under-exposed image is placed mid-way through the longer exposure period, i.e between $T_0$ and $T_0+T_{short}$. As such, the actual exposing scheme goes as follows:

At t=0 start exposing
At t=$T_0$ take the first readout to obtain G'
At t=$T_0+T_{short}$ take the second readout to obtain G
The short exposed image is G=G'−G"

At t=$T_{long}$ take the third (last) readout to obtain the well-exposed frame, F.
Reset the image sensor.

This means that statistically, the chances of content differences between the short exposure and the long exposure images G and F are minimized. Again, statistically, it is therefore more likely that the differences are caused only by the motion existing in the period [0, $T_{long}$]. The well exposed picture is blurred by the motion existing in its exposure period, while the other is not moved at all, i.e. the motion blur makes the content differences.

Figure 9E:
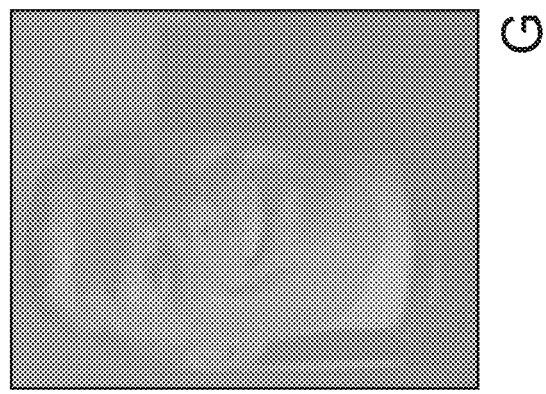
Figure 9D:
Figure 9C:
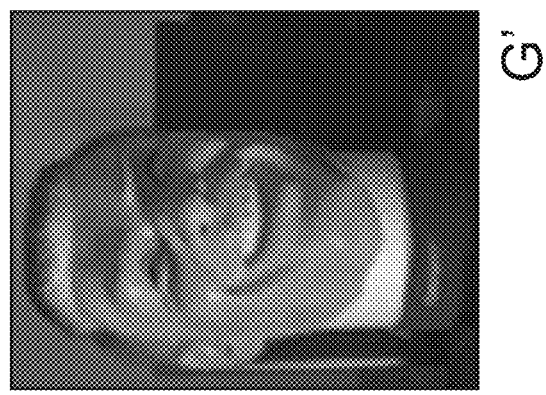

Referring now to FIG. 9, a still image of a scene is recorded. The period $T_0$ is chosen to be long enough so that motion appears in the image G' read at time $T_0$, FIG. 9(c). The values of the PSF for this image are shown in FIG. 9(a). From $T_0$ to $T_{short}$ there is not enough time for extra motion to appear. However, the entire interval, [0;$T_0+T_{short}$], is long enough so that the resulting image G", FIG. 9(d), will be blurred as can be seen from the corresponding PSF values of FIG. 9(b). The resulting under-exposed image, G=G"−G', FIG. 9 (e), is not blurred as can be seen from the small difference between the PSF values for the original images G" and G'.

The image G can now be combined with the image F through adaptive filtering as described above and in particular in relation to the second embodiment, luminance enhancement can be performed on the image G before being combined with the image F.

Subsequent to producing the filtered image 40 through adaptive filtering, the filtered image can be subjected to further processing to improve its quality further.

Noise correction of the filtered image can be performed using a modified version of the Lee Least mean square (LLMSE) filter. In the following example, $G_1$ is the filtered image, $G_1^x$ is the convolution of $G_1$ with an X×X uniform averaging kernel; so $G_1^3$ is the convolution of $G_1$ with a 3×3 uniform averaging kernel; and $G_1^7$ is the convolution of $G_1$ with a 7×7 uniform averaging kernel.

The noise cleared picture is: $G_2=\alpha G_1^x+(1-\alpha)G_1$
where $$\alpha = \frac{s_n}{s_n + s_F}$$

$S_{G1}$ is the filtered image standard deviation computed for a 5×5 vicinity of a pixel;
$S_F$ is the well-exposed image squared standard deviation computed for a 3×3 vicinity of the corresponding pixel; and $$s_n = |s_F - s_{G1}|$$

If $S_F$ is smaller than a predetermined threshold (meaning that the current pixel in a perfectly uniform area) then $G_1^x=G_1^7$ otherwise (in the current pixel neighborhood there is an edge) $G_1^x=G_1^3$. It will therefore be seen that where the variation around a pixel is high, $G_2$ is approximately equal to $G_1$.

Figure 10:
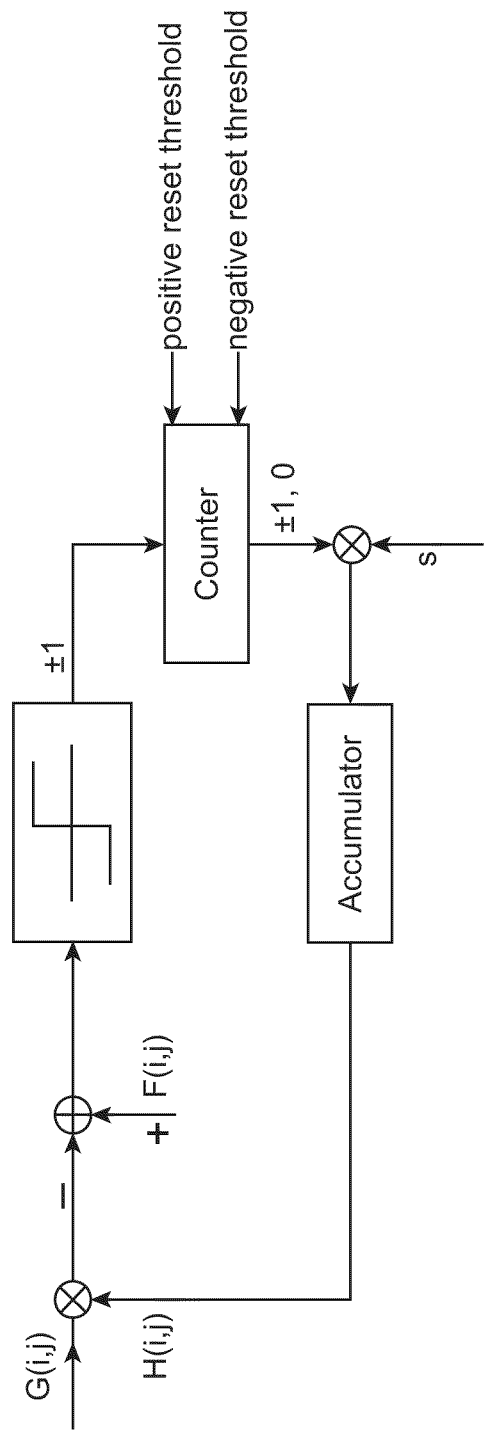
FIG. 10 illustrates an image enhancement algorithm in accordance with certain embodiments.

As discussed, the under-exposed acquired image has intensities in the lower part of the range (darkness range). The spectral characteristics of the cameras, in this area, differ from those of normally exposed areas. Therefore, the adaptively filtered image, $G_1$ or $G_2$, depending on whether noise filtering has been applied or not, may have deviations in color. To compensate for these deviations, a rotation or a translation in the (Cb,Cr) plane can be applied. The parameter values for these operations will depend on the camera and number of exposure stops between the well-exposed and the under-exposed images. One exemplary scheme for color correction in RBG space is as follows:

Compute the average luminance: ($\overline{Y_F}, \overline{Y_{G2}}$)
Compute the color averages ($\overline{R_F}, \overline{R_{G2}}, \overline{Gr_F}, \overline{Gr_{G2}} \overline{B_F}, \overline{B_{G2}}$)
Correct $G_2$ to obtain $G_3$ as follows:

FIG. 10 illustrates an algorithm in accordance with one embodiment of the invention. As shown in FIG. 10, two images of similar size are selected. The pair of images with image G being a full resolution under-exposed image (M×N×3) and image F being a well exposed preview (P×Q×3). Where M>P and N>Q. For one embodiment, the smaller image can be interpolated or up-sampled to the size of the full resolution image.

In certain embodiments, non-linear adaptive amplification is used with a logarithmic model. A one-pass dynamic range correction method may also be used to correct the uneven luminance of a previously obtained image, and noise correction may be used.

As shown in FIG. 10, an initial coefficient, H(1,1), is computed as a function of the ratio of exposure times of the well exposed preview and of the full resolution image or the ratio of average luminance of both pictures. The rows or columns of one color channel are parsed and two corresponding pixels are taken from both images (F(i,j) and G(i,j)). They can be from each color channel or preferably the grayscale values. For this pixel pair, the coefficient is changed to: H(i,j)=H(i−1,j)+s·sign(F(i,j)−H(i−1,j)·G(i,j)), where s is a step size whose value depends on the dynamic range of the pixels. Therefore, if F(i,j)>H(i−1,j)·G(i,j), H(i,j) become H(i−1,j)+s, otherwise is H(i−1,j)−s as shown in FIG. 10. It corresponds to the sign-data sign-error LMS for L=1 used in the same way as the other adaptive algorithm equations mentioned in U.S. application Ser. No. 11/856,721, which is assigned to the same assignee and is hereby incorporated by reference. The update of H can be performed after a number of pixels are passed through the comparator. For example, a counter is incremented for each +1 from the output of the comparator and decremented for each −1 from the output of the comparator. The value of the H is updated to H+s. if the counter reaches a specified positive value (e.g. 256) and to H−s if the counter reaches a specified negative value (e.g. −256). The step size depends on the size of the full resolution picture, the thresholds or the allowed bandwidth around the initial value (e.g. around 0.0001 for 8-bit images and above mentioned thresholds). Another possibility is to use an adaptive step size, depending on previous values of the comparator.

The non-linear amplification is performed for each pixel of the under-exposed image, G(i,j,k), with i=1 ... M, j=1 ... N, k=1, 2, 3. A conventional logarithmic image model may be used in order to avoid the saturation of the colors.

For each color channel, k, the amplification if performed as:

$$G_1(i, j, k) = D - D\left(1 - \frac{G(i, j, k)}{D}\right)^{g \cdot H(i,j)}$$

where D is the maximum permitted value (e.g. 255 for 8 bit representation of images) and g is a constant with values between 1 and 3. Simple examination of the formula above shows that only values smaller that D may be obtained.

Still referring to FIG. 10, an IIR method may be implemented on digital camera or phone camera which addresses the potential problems arising from use of poles very close to 1 (e.g. 0.999999). A similar technique to that used in adaptive modulation schemes avoids the propagation of the errors and can replace the IIR block. This advantageous method may be efficiently implemented and is robust in finite precision implementations. There is no need to perform image registration between picture pair, linear regression or gamma correction. The method shows robustness to image content differences and low quality previews. Also, the method can be easily applied to create video frames from the under-exposed and well exposed frame pair.

Acquisition

In an image acquisition operation in accordance with certain embodiments, the camera will acquire two images (one full-resolution under-exposed image and a well exposed blurred image (can be a preview, post-view, exposure overlap, or another full resolution image).

Algorithm

Two images of similar size are obtained. For example, a pair of images may include image G which is a full resolution under-exposed image (M×N×3) and image F may be a well exposed preview or postview image (P×Q×3), while M>P and N>Q.

The smaller image can be interpolated or up-sampled to the size of the full resolution image.

There are the following steps:
Non-linear adaptive amplification using the logarithmic model
The one pass dynamic range correction method presented in FN-275-modified ID.doc is used to correct the uneven luminance of previously obtained image
noise correction
Non-linear adaptive amplification using the logarithmic model An initial coefficient, H(1,1), is computed as a function of the ratio of exposure times of the well exposed preview and of the full resolution image or the ratio of average luminance of both pictures. We parse the rows or columns of one color channel and take two corresponding pixels from both images (F(i,j) and G(i,j)). They can be from each color channel or preferably the grayscale values. For this pixel pair, the coefficient is changed to: H(i,j)=H(i−1,j)+s·sign(F(i,j)−H(i−1,j)·G(i,j)), where s is a step size whose value depends on the dynamic range of the pixels. Therefore, if F(i,j)>H(i−1,j)·G(i,j), H(i,j) become H(i−1,j)+s, otherwise is H(i−1, j)−s (FIG. 1). It corresponds to the sign-data sign-error LMS for L=1 used in the same way as the other adaptive algorithm equations mentioned in FN-204.

The update of H can be performed after a number of pixels are passed through the comparator. For example, a counter is incremented for each +1 from the output of the comparator and decremented for each −1 from the output of the comparator. The value of the H is updated to H+s. if the counter reaches a specified positive value (e.g. 256) and to H−s if the counter reaches a specified negative value (e.g. −256). The step size depends on the size of the full resolution picture, the thresholds or the allowed bandwidth around the initial value (e.g. around 0.0001 for 8-bit images and above mentioned thresholds). Another possibility is to use an adaptive step size, depending on previous values of the comparator.

The non-linear amplification is performed for each pixel of the under-exposed image, G(i,j,k), with i=1 ... M, j=1 ... N, k=1, 2, 3. The classical logarithmic image model described by the following papers may be used in order to avoid the saturation of the colors.

Jourlin, M., Pinoli, J. C.: "Logarithmic image processing. the mathematical and physical framework fro the representation and processing of transmitted images" Advances in Imaging and Electron Physics 115 (2001) 129-196, and Deng, G., Cahill, L. W., Tobin, G. R.: "The study of logarithmic image processing model and its application to image enhancement". IEEE Trans. on Image Processing 4 (1995) 506-512, each has been referenced and incorporated by reference above For each color channel, k, the amplification if performed as:

$$G_1(i, j, k) = D - D\left(1 - \frac{G(i, j, k)}{D}\right)^{\varepsilon \cdot H(i,j)}$$

where D is the maximum permitted value (e.g. 255 for 8 bit representation of images) and $\epsilon$ is a constant with values between 1 and 3. Simple examination of the formula above shows that only values smaller that D may be obtained.

For each pixel, a conversion RGB to YCbCr is performed and the one pass dynamic range correction method presented in PCT/EP08/000,378, assigned to the same assigned and incorporated by reference, may be used to correct the uneven luminance of the previously computed pixel. A conversion YCbCr to RGB is performed (see FIG. 11). The DRC operation can be performed on RGB color space as well.

The noise correction is performed using any known method in YCC, RGB or other color space on the enhanced image. The strength of the de-noising method depends on the computed DRC coefficient.

Figure 11:
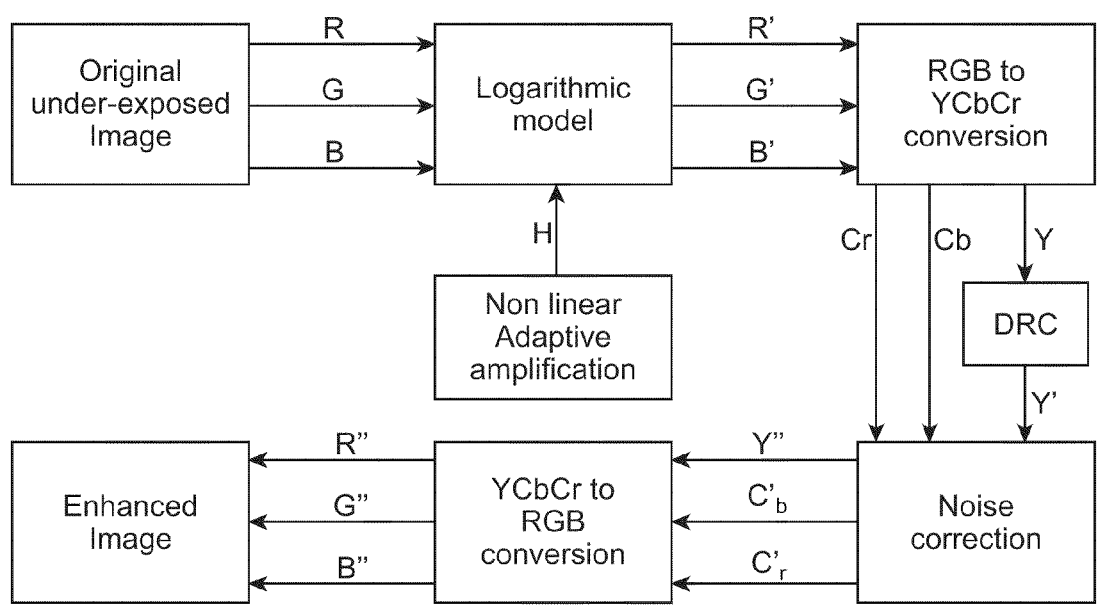
FIG. 11 illustrates the image processing to effect image enhancement in accordance with certain embodiments.

The dynamic range correction and noise correction are shown in FIG. 11. For each pixel, a conversion RGB to YCbCr is performed and a one pass dynamic range correction method is used to correct the uneven luminance of the previously computed pixel. A conversion YCbCr to RGB is performed. The DRC step can be performed on RGB color space as well. The noise correction is performed using any known method in YCC, RGB or other color space on the enhanced image. The strength of the de-noising method depends on the computed DRC coefficient.

For alternative embodiments, the non-linear adaptive technique may use a fixed/variable step size, a counter and two thresholds. In a further alternative embodiment, the noise reduction method strength is correlated depending on the coefficient computed by the DRC method.

The present invention provides a one-pass image technique that uses an IIR filter to improve the quality of pictures, using only one image and with efficient use of processor resources.

Certain embodiments provide for the automatic correction of uneven luminance in the foreground/background of an image. This implementation improves quality especially where the background is more illuminated/or darker than the foreground.

Implementations of these embodiments provide an estimate of the average of the red, green and blue channels while another recursive filter filters a term that has a component inversely proportional with the values of each color plane pixel value or the intensity value. Its output is multiplied with one or more correction terms dependent on the color channel(s) and preferably limited by two thresholds. The enhanced pixel value is obtained by using a linear or logarithmic model.

Using the embodiment, as well as an automatic correction of uneven luminance in the foreground/background, color boost is also obtained.

In certain embodiments, the average values of each color channel are not used for comparison purposes and they can be replaced by sliding averaging windows ending on the pixel being processed. In any case, these average values are used to determine correction terms which in turn are used to avoid over-amplification of red or blue channels.

Coefficients of the IIR filter may be advantageously fixed, rather than employ adaptive filters. As such, the present method may involve merely one pass through an image and the output of one filter does not have to be used as an input to another filter.

Figure 12:
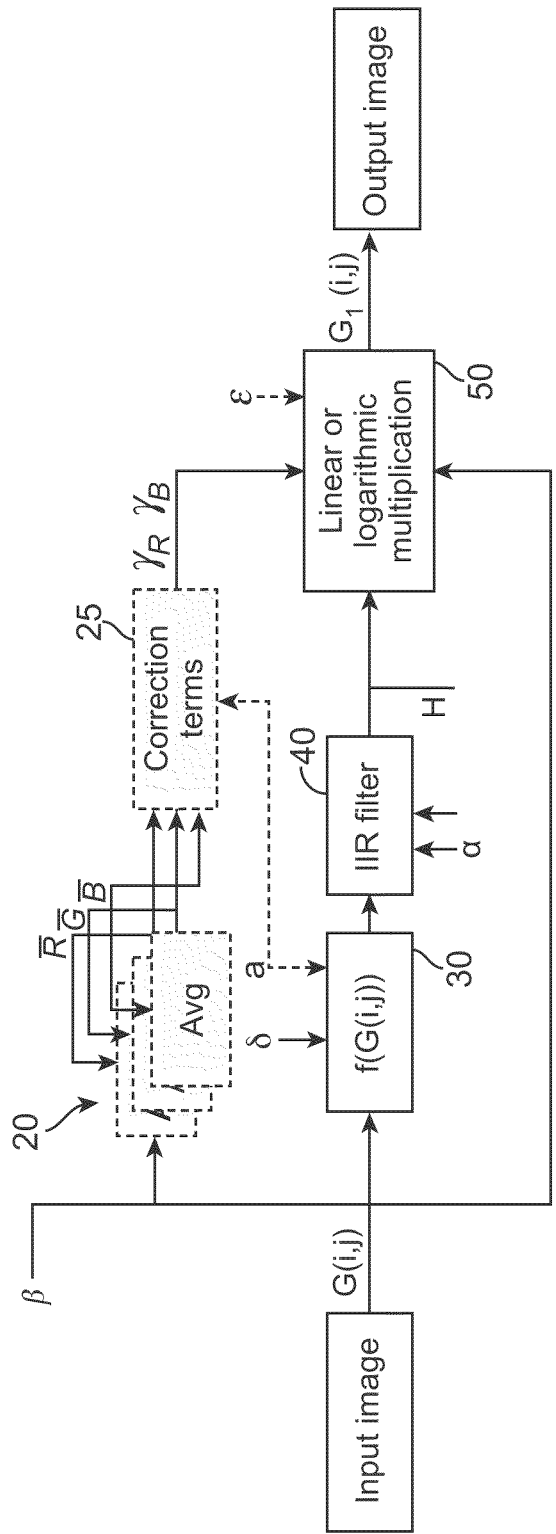
FIG. 12 illustrates a processing structure to sharpen an image in accordance with certain embodiments.

Referring now to FIG. 12, an acquired image G is supplied for filtering according to the present invention. While the embodiment is described in terms of processing an image in RGB space, the invention can be applied to luminance channels only or other color spaces.

Only one input image, G, is used and a running average on each color channel is computed 20 as each pixel value is read. Therefore for each pixel G(i,j,k) of each plane k=1 ... 3, we compute:

$$\overline{R} = \beta \cdot \overline{R} + (1-\beta) \cdot G(i,j,1)$$

$$\overline{G} = \beta \cdot \overline{G} + (1-\beta) \cdot G(i,j,2)$$

$$\overline{B} = \beta \cdot \overline{B} + (1-\beta) \cdot G(i,j,3),$$

where $\beta$ is a coefficient between 0 and 1.

Another variant is to compute on each color channel, the sum of 2N+1 pixel values around the pixel G(i,j,k) and divide by 2N+1.

From the moving average values, $\overline{R}, \overline{G}, \overline{B}$, correction terms $\gamma_R, \gamma_B$ are calculated, step 25, as follows:

$$\gamma_R = \frac{\overline{G}}{\overline{R}} \cdot \frac{[(1-a) \cdot \overline{R} + 255 \cdot a]}{[(1-a) \cdot \overline{G} + 255 \cdot a]} \text{ and } \gamma_B = \frac{\overline{G}}{\overline{B}} \cdot \frac{[(1-a) \cdot \overline{B} + 255 \cdot a]}{[(1-a) \cdot \overline{G} + 255 \cdot a]}$$

Preferably, both correction terms, $\gamma_R$ and $\gamma_B$ values are limited within a chosen interval (e.g. between 0.95 and 1.05; if any of $\gamma_R$ and $\gamma_B$ values is below 0.95 their value is set to 0.95; if any of $\gamma_R$ and $\gamma_B$ values is above 1.05 their value is set to 1.05). This prevents over-amplification of the red and blue channels in further processing.

In parallel with generating the moving average values, the pixels are parsed on rows or columns and for each pixel of a color plane G(i,j,k), a coefficient H(i,j) is calculated as follows:

$$H(i, j) = \alpha H(i, j-1) + (1-\alpha)\left(1 - a + \frac{255 \cdot a}{\max\left(\delta, \frac{\left(G(i, j, 1) + G(i, j, 2) + G(i, j, 3)\right)}{3}\right)}\right)$$

In FIG. 12, this processing is broken into step 30:

$$f(G(i, j, k), a, \delta) = \left(1 - a + \frac{255 \cdot a}{\max\left(\delta, \frac{\left(G(i, j, 1) + G(i, j, 2) + G(i, j, 3)\right)}{3}\right)}\right)$$

followed by a recursive filter, step 40:

$$H(i,j) = \alpha H(i,j-1) + (1-\alpha)(f(G(i,j,k),a\delta))$$

where:

$\alpha$ is a positive value less than 1 (e.g. $\alpha$=0.125); and
$\alpha$ is the pole of the corresponding recursive filtering, e.g. $\alpha$ can have values between 0.05 and 0.8).

The comparison with δ is used in order to avoid division by zero and to amplify dark pixels (e.g. δ=15). The initial value H(1,1) can have values between 1 and 2.

Using this filter, darker areas are amplified more than illuminated areas due to the inverse values averaging and, therefore, an automatic correction of uneven luminance in the foreground/background is obtained.

It will be seen from the above that the recursive filter, H, doesn't filter the pixel values. For example, if a=α=⅛ and δ=15, the filter 30/40 is filtering a sequence of numbers that varies between 1 and 3 depending on actual pixel value G(i,j,k) and the preceding values of the image. If the filter 40 simply uses as input the pixel values G(i,j,k), it generates a simple low pass filtered image, with no luminance correction.

In one implementation of the embodiment, the modified pixel values, $G_1(i,j,k)$, are given by a linear combination, step 50, of the filter parameters H and the correction terms $\gamma_R, \gamma_B$:

$$G_1(i,j,1) = G(i,j,1) \cdot H(i,j) \cdot \gamma R$$

$$G_1(i,j,2) = G(i,j,2) \cdot H(i,j)$$

$$G_1(i,j,3) = G(i,j,3) \cdot H(i,j) \cdot \gamma_B.$$

One more complex alternative to the linear model is a logarithmic model. In such an implementation, the output pixel $G_1(i,j,k)$ corresponding to the enhanced color plane (R/G/B color planes), is as follows:

$$G_1(i, j, 1) = D - D\left(1 - \frac{G(i, j, 1)}{D}\right)^{\epsilon H(i,j)\gamma_R},$$

$$G_1(i, j, 2) = D - D\left(1 - \frac{G(i, j, 2)}{D}\right)^{\epsilon H(i,j)},$$

$$G_1(i, j, 3) = D - D\left(1 - \frac{G(i, j, 3)}{D}\right)^{\epsilon H(i,j)\gamma_B}$$

where:
D is the maximum permitted value (e.g. 255 for 8 bit representation of images); and ϵ is a constant whose indicated values are between 1 and 3.

Examination of the formula above shows that only values smaller than D may be obtained. In this implementation, the degree of color and brightness boost are obtained by varying the pole value (α) and the logarithmic model factor (ϵ).

The computations can be adapted for the YCC or other color spaces. For example, when using YCC color space in the embodiment of FIG. 2, there is no need to compute the correction terms $\gamma_R, \gamma_B$, and ϵ=1 for the Y channel if the logarithmic model is used. The inverting function for the Y channel is therefore:

$$f(Y(i, j), a, \delta) = \left(1 - a + \frac{255 \cdot a}{\max(\delta, Y(i, j))}\right).$$

The linear model can be applied for the luminance channel and the logarithmic model can be used for the chrominance channels using the H(i,j) coefficient computed on the luminance channel.

This approach leads to computational savings and add the possibility of adjusting the color saturation by using a different positive value for ϵ (e.g. ϵ=0.9) when computing the new chrominance values. The brightness of the enhanced image can be varied by multiplying the Y channel with a positive factor, g, whose value can be different than the value of g used for the chrominance channels.

In another embodiment, the processing structure of FIG. 2 can be used to sharpen an image.

In this embodiment, the image is preferably provided in YCC format and the processing is performed on the Y channel only. The ratio of the next pixel and the current pixel value is computed and filtered with a one pole IIR filter (e.g. α=1/16), step 40. The operations can be performed on successive or individual rows or columns. The initial H coefficient is set to 1 and in case of operating on row i we have:

$$H(i, j) = \alpha H(i, j-1) + (1-\alpha)\frac{Y(i, j+1)}{\max(\delta, Y(i, j))},$$

where:
α is the pole of the IIR filter.

Again, this processing can be broken down in step 30:

$$f(Y(i, j), \delta) = \frac{Y(i, j+1)}{\max(\delta, Y(i, j))}$$

followed by the recursive filter, step 40:

$$H(i,j) = \alpha H(i,j-1) + (1-\alpha)(f(Y(i,j),\delta))$$

Again, the comparison with δ is used in order to avoid division by zero (δ is usually set to 1). H(i,j) is a coefficient that corresponds to the current pixel position (i, j) of the original image. The initial coefficient can be set to 1 at the beginning of the first row or at the beginning of each row. In the first case, the coefficient computed at the end of the one row is used to compute the coefficient corresponding to the first pixel of the next row.

The enhanced pixel value $Y_1(i,j)$ is given by the following formula:

$$Y_1(i,j) = Y(i,j)[1+\epsilon(i,j)\cdot(1-H(i,j))]$$

where ϵ(i,j) can be a constant gain factor or a variable gain depending on the H coefficients. Another alternative for ϵ(i,j) is to use the difference between consecutive pixels or the ratio of successive pixel values. For example, if the difference between successive pixels is small (or the ratio of consecutive pixel values is close to 1) the value of ϵ(i,j) should be lower, because the pixel might be situated in a smooth area. If the difference is big (or the ratio is much higher or much lower than 1), the pixels might be situated on an edge, therefore the value of δ(i,j) should be close to zero, in order to avoid possible over-shooting or under-shooting problems. For intermediate values, the gain function should vary between 0 and a maximum chosen gain. An example of ϵ(i,j) according to these requirements has a Rayleigh distribution.

In some implementations, a look up table (LUT) can be used if a variable ϵ(i,j) is chosen, because the absolute difference between consecutive pixels has limited integer values.

This method is highly parallelizable and its complexity is very low. The complexity can be further reduced if LUTs are used and some multiplications are replaced by shifts.

Furthermore, this embodiment can also be applied to images in RGB space.

This embodiment can be applied in sharpening video frames either by sharpening each individual video frame or identified slightly blurred frames.

In each embodiment, the pixels can be parsed using any space-filling curves (e.g. Hilbert curves), not only by rows or columns. The corrected image can be thought as a continuously modified image, pixel by pixel, through a path of a continuously moving point.

It will also be seen that the image sharpening image processing of this embodiment can be applied after the luminance correction of the first embodiment to provide a filtered image with even superior characteristics to either method implemented independently.

Indeed either method can be applied in conjunction with other image processing methods as required for example following the processing described in PCT Application No. PCT/EP2007/009939, hereby incorporated by reference.

In accordance with an embodiment, image enhancement data processing is effected using a digital processing system (DPS). The DPS may be configured to store, process, and communicate a plurality of various types of digital information including digital images and video.

Certain embodiments may employ a DPS or devices having digital processing capabilities. Exemplary components of such a system include a central processing unit (CPU), and a signal processor coupled to a main memory, static memory, and mass storage device. The main memory may store various applications to effect operations of certain embodiments, while the mass storage device may store various digital content. The DPS may also be coupled to input/output (I/O) devices and audio/visual devices. The CPU may be used to process information and/or signals for the processing system. The main memory may be a random access memory (RAM) or some other dynamic storage device, for storing information or instructions (program code), which are used by the CPU. The static memory may be a read only memory (ROM) and/or other static storage devices, for storing information or instructions, which may also be used by the CPU. The mass storage device may be, for example, a hard disk drive, optical disk drive, or firmware for storing information or instructions for the processing system.

Embodiments have been described involving image enhancement methods and systems.

Embodiments have been described as including various operations. Many of the processes are described in their most basic form, but operations can be added to or deleted from any of the processes without departing from the scope of the invention. The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central cite or, alternatively, one or more operations may be performed elsewhere.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. An image processing method to process a first relatively underexposed and sharp image of a scene, and a second relatively well exposed and blurred image nominally of the same scene, said method comprising:
   providing a portion of said first relatively underexposed image as an input signal to an adaptive filter;
   providing a corresponding portion of said second relatively well exposed image as a desired signal to said adaptive filter;
   producing an output signal from said input signal and said desired signal by multiplying the input signal by one or more coefficients that are calculated from values of the input signal and the desired signal;
   constructing a first filtered image, from said output signal, that is relatively less blurred than said second image; and
   displaying, transmitting, projecting or storing the first filtered image or a further processed version, or combinations thereof;
   wherein the method is performed by one or more computing devices.

2. An image processing method according to claim 1 wherein said first and second images are in YCC format and has image portions that comprise a respective Y plane of said first and second images.

3. An image processing method according to claim 2 wherein said constructing said first filtered image comprises using said output signal as a Y plane of said first filtered image and using Cb and Cr planes of said input image as the Cb and Cr planes of said first filtered image.

4. An image processing method according to claim 1 wherein:
   said first image is derived from a first image source;
   said second image is derived from a second image source; and
   said second image source for said second image is of a relatively higher resolution than said first image source for said first image.

5. An image processing method according to claim 4 further comprising aligning and interpolating said first image source to match the alignment and resolution of said second image source.

6. An image processing method according to claim 1 wherein said first image is one of an image acquired soon before or after said second image.

7. An image processing method according to claim 1 wherein:
   said first image is derived from a first image source;
   said second image is derived from a second image source; and
   said second image source for said second image is of a relatively lower resolution than said first image source for said first image.

8. An image processing method according to claim 7 further comprising aligning and interpolating said second image source to match the alignment and resolution of said first image source.

9. An image processing method according to claim 8 comprising, responsive to said first and second image sources being misaligned by more than a pre-determined threshold, providing said desired signal from a linear combination of said first and second image sources.

10. An image processing method according to claim 8 comprising, responsive to said first and second image sources being misaligned by more than a pre-determined threshold, providing said desired signal from a combination of phase values from one of said first and second image sources and amplitude values for the other of said first and second image sources.

11. An image processing method according to claim 1 comprising noise filtering said first filtered image.

12. An image processing method according to claim 1 comprising applying color correction to the first filtered image or a noise filtered image or both.

13. An image processing method according to claim 1 comprising: acquiring a first partially exposed image from an image sensor;
acquiring a second further exposed image from said image sensor; and subsequently resetting said image sensor,
wherein said first relatively underexposed and sharp image of a scene is obtained by subtracting said first partially exposed image from said second further exposed image.

14. An image processing method according to claim 13 wherein said second relatively well exposed and blurred image is obtained from said image sensor just prior to said resetting.

15. An image processing method comprising:
obtaining a first relatively underexposed and sharp image of a scene;
obtaining a second relatively well exposed and blurred image, nominally of the same scene;
providing a portion of said first relatively underexposed image as an input signal to an adaptive filter;
providing a corresponding portion of said second relatively well exposed image as a desired signal to said adaptive filter;
adaptively filtering said input signal to produce an output signal by multiplying the input signal by one or more coefficients that are calculated from values of the input signal and the desired signal;
constructing a first filtered image, from said output signal, relatively less blurred than said second image; and
displaying, transmitting, projecting or storing the first filtered image or a further processed version, or combinations thereof;
wherein the method is performed using one or more computing devices.

16. An image processing method according to claim 15 comprising:
providing a portion of said first filtered image as said input signal to an adaptive filter;
providing a corresponding portion of said second image as a desired signal to said adaptive filter;
further adaptively filtering said input signal to produce a further output signal;
constructing a further filtered image from said further output signal relatively less blurred than said first filtered image.

17. An image processing method according to claim 16, wherein said first and second images are in RGB format to produce said first filtered image having image portions;
wherein said image portions comprise a respective color plane of said first and second images;
wherein said providing a portion of said first filtered image comprises converting said first filtered image to YCC format;
wherein said method further comprises converting said second image to YCC format; and
wherein said image portions for further adaptive filtering comprise a respective Y plane of said converted image.

18. An image processing method according to claim 17,
wherein said first and second images are in YCC format and, for producing said first filtered image;
wherein said image portions comprise a respective Y plane of said first and second images;
wherein said providing a portion of said first filtered image comprises converting said first filtered image to RGB format;
wherein said method further comprises converting said second image to RGB format; and
wherein said image portions for further adaptive filtering comprise a respective color plane of said converted image.

19. An image processing method according to claim 15 wherein said adaptively filtering is performed one of row or column wise on said input signal and wherein further adaptively filtering is performed on the other of row or column wise on said input signal.

20. An image processing method according to claim 15 comprising noise filtering said first filtered image.

21. An image processing method according to claim 15 comprising applying color correction to one of said first filtered image or a noise filtered image.

22. An image processing method according to claim 17, wherein said first and second images are in RGB format and wherein said image portions comprise a respective color plane of said first and second images.

23. An image processing method according to claim 22,
wherein said adaptively filtering includes producing a set of filter coefficients from a combination of said input signal and an error signal being the difference between said desired signal and said output signal; and
wherein the method further comprises constructing each color plane of said first filtered image from a combination of said filter coefficients and color plane information of said input signal.

24. An image processing method as claimed in claim 15 comprising:
prior to adaptive filtering, estimating a point spread function, PSF, for said second image; and
de-blurring said second image with said point spread function.

25. An image processing method according to claim 24 wherein said de-blurring is performed in response to said PSF being less than a pre-determined threshold.

26. An image processing method according to claim 15 comprising the steps of amplifying luminance characteristics of said under exposed image prior to said adaptively filtering.

27. An image processing apparatus arranged to process a first relatively underexposed and sharp image of a scene, and a second relatively well exposed and blurred image, nominally of the same scene, said apparatus comprising:
means for providing a portion of said first relatively underexposed image as an input signal to an adaptive filter;
means providing a corresponding portion of said second relatively well exposed image as a desired signal to said adaptive filter;
an adaptive filter arranged to produce an output signal from said input signal and said desired signal by multiplying the input signal by one or more coefficients that are calculated from values of the input signal and the desired signal; and an image generator arranged to construct a first filtered image from said output signal, relatively less blurred than said second image.

28. One or more non-transitory processor-readable media having embedded therein processor-readable code for programming a processor to perform an image processing method to process a first relatively underexposed and sharp image of a scene, and a second relatively well exposed and blurred image nominally of the same scene, said method comprising:

providing a portion of said first relatively underexposed image as an input signal to an adaptive filter;

providing a corresponding portion of said second relatively well exposed image as a desired signal to said adaptive filter;

producing an output signal from said input signal and said desired signal by multiplying the input signal by one or more coefficients that are calculated from values of the input signal and the desired signal;

constructing a first filtered image, from said output signal, that is relatively less blurred than said second image.

29. One or more processor-readable media according to claim 28 wherein said first and second images are in YCC format and has image portions that comprise a respective Y plane of said first and second images.

30. One or more processor-readable media according to claim 29 wherein said constructing said first filtered image comprises using said output signal as a Y plane of said first filtered image and using Cb and Cr planes of said input image as the Cb and Cr planes of said first filtered image.

31. One or more processor-readable media according to claim 28 wherein:

said first image is derived from a first image source;
said second image is derived from a second image source; and
said second image source for said second image is of a relatively higher resolution than said first image source for said first image.

32. One or more processor-readable media according to claim 31 wherein the method further comprises aligning and interpolating said first image source to match the alignment and resolution of said second image source.

33. One or more processor-readable media according to claim 28, wherein said first image is one of an image acquired soon before or after said second image.

34. One or more processor-readable media according to claim 31, wherein said second image source for said second image is of a relatively lower resolution than said first image source for said first image.

35. One or more processor-readable media according to claim 34, wherein the method further comprises aligning and interpolating said second image source to match the alignment and resolution of said first image source.

36. One or more processor-readable media according to claim 35, wherein the method further comprises, responsive to said first and second image sources being misaligned by more than a pre-determined threshold, providing said desired signal from a linear combination of said first and second image sources.

37. One or more processor-readable media according to claim 31, wherein the method further comprises, responsive to said first and second image sources being misaligned by more than a pre-determined threshold, providing said desired signal from a combination of phase values from one of said first and second image sources and amplitude values for the other of said first and second image sources.

38. One or more processor-readable media according to claim 28, wherein the method further comprises noise filtering said first filtered image.

39. One or more processor-readable media according to claim 28, wherein the method further comprises applying color correction to the first filtered image or a noise filtered image or both.

40. One or more processor-readable media according to claim 28, wherein the method further comprises:

acquiring a first partially exposed image from an image sensor;

acquiring a second further exposed image from said image sensor; and subsequently resetting said image sensor, wherein said first relatively underexposed and sharp image of a scene are obtained by subtracting said first partially exposed image from said second further exposed image.

41. One or more processor-readable media according to claim 40, wherein said second relatively well exposed and blurred image is obtained from said image sensor just prior to said resetting.

42. One or more non-transitory processor-readable media having embedded therein processor-readable code for programming a processor to perform an image processing method that comprises:

obtaining a first relatively underexposed and sharp image of a scene;

obtaining a second relatively well exposed and blurred image, nominally of the same scene providing a portion of said first relatively underexposed image as an input signal to an adaptive filter;

providing a corresponding portion of said second relatively well exposed image as a desired signal to said adaptive filter;

adaptively filtering said input signal to produce an output signal by multiplying the input signal by one or more coefficients that are calculated from values of the input signal and the desired signal; and constructing a first filtered image, from said output signal, relatively less blurred than said second image.

43. One or more processor-readable media according to claim 42, wherein the method further comprises:

providing a portion of said first filtered image as said input signal to an adaptive filter;

providing a corresponding portion of said second image as a desired signal to said adaptive filter;

further adaptively filtering said input signal to produce a further output signal;

constructing a further filtered image from said further output signal relatively less blurred than said first filtered image.

44. One or more processor-readable media according to claim 43, wherein said first and second images are in RGB format to produce said first filtered image that has image portions that comprise a respective color plane of said first and second images;

wherein said providing a portion of said first filtered image comprises converting said first filtered image to YCC format;

wherein said method further comprises converting said second image to YCC format; and wherein said image portions for further adaptive filtering comprise a respective Y plane of said converted image.

45. One or more processor-readable media according to claim 44, wherein said first and second images are in YCC format and, for producing said first filtered image;

wherein said image portions comprise a respective Y plane of said first and second images; and wherein said providing a portion of said first filtered image comprises converting said first filtered image to RGB format;

wherein said method further comprises converting said second image to RGB format; and wherein said image portions for further adaptive filtering comprise a respective color plane of said converted image.

46. One or more processor-readable media according to claim 42 wherein said adaptively filtering is performed one of row or column wise on said input signal and wherein further adaptively filtering is performed on the other of row or column wise on said input signal.

47. One or more processor-readable media according to claim 42, wherein the method further comprises noise filtering said first filtered image.

48. One or more processor-readable media according to claim 42, wherein the method further comprises applying color correction to one of said first filtered image or a noise filtered image.

49. One or more processor-readable media according to claim 44, wherein said first and second images are in RGB format and wherein said image portions comprise a respective color plane of said first and second images.

50. One or more processor-readable media according to claim 49, wherein said adaptively filtering includes producing a set of filter coefficients from a combination of said input signal and an error signal being the difference between said desired signal and said output signal; and wherein the method further comprises constructing each color plane of said first filtered image from a combination of said filter coefficients and color plane information of said input signal.

51. One or more processor-readable media as claimed in claim 42, wherein the method further comprises:
    prior to adaptive filtering, estimating a point spread function, PSF, for said second image; and
    de-blurring said second image with said point spread function.

52. One or more processor-readable media according to claim 51 wherein said de-blurring is performed in response to said PSF being less than a pre-determined threshold.

53. One or more processor-readable media according to claim 42, wherein the method further comprises amplifying luminance characteristics of said under exposed image prior to said adaptively filtering.

54. A portable digital image acquisition device, comprising a lens, an image sensor for capturing a digital image, a processor, and one or more processor-readable media having processor-readable code embedded therein for programming the processor to process a first relatively underexposed and sharp image of a scene, and a second relatively well exposed and blurred image nominally of the same scene, and wherein the processor performs:
    providing a portion of said first relatively underexposed image as an input signal to an adaptive filter;
    providing a corresponding portion of said second relatively well exposed image as a desired signal to said adaptive filter;
    producing an output signal from said input signal and said desired signal by multiplying the input signal by one or more coefficients that are calculated from values of the input signal and the desired signal;
    constructing a first filtered image, from said output signal, that is relatively less blurred than said second image; and
    displaying, transmitting, projecting or storing the first filtered image or a further processed version, or combinations thereof.

55. A portable digital image acquisition device according to claim 54 wherein said first and second images are in YCC format and has image portions that comprise a respective Y plane of said first and second images.

56. A portable digital image acquisition device according to claim 55 wherein said constructing said first filtered image comprises using said output signal as a Y plane of said first filtered image and using Cb and Cr planes of said input image as the Cb and Cr planes of said first filtered image.

57. A portable digital image acquisition device according to claim 54 wherein;
    said first image is derived from a first image source;
    said second image is derived from a second image source; and
    said second image source for said second image is of a relatively higher resolution than said first image source for said first image.

58. A portable digital image acquisition device according to claim 57 further comprising aligning and interpolating said first image source to match the alignment and resolution of said second image source.

59. A portable digital image acquisition device according to claim 54 wherein said first image is one of an image acquired soon before or after said second image.

60. A portable digital image acquisition device according to claim 57 wherein said second image source for said second image is of a relatively lower resolution than said first image source for said first image.

61. A portable digital image acquisition device according to claim 60, wherein the method further comprises aligning and interpolating said second image source to match the alignment and resolution of said first image source.

62. A portable digital image acquisition device according to claim 61, wherein the method further comprises, responsive to said first and second image sources being misaligned by more than a pre-determined threshold, providing said desired signal from a linear combination of said first and second image sources.

63. A portable digital image acquisition device according to claim 61, wherein the method further comprises, responsive to said first and second sources being misaligned by more than a pre-determined threshold, providing said desired signal from a combination of phase values from one of said first and second image sources and amplitude values for the other of said first and second image sources.

64. A portable digital image acquisition device according to claim 54, wherein the method further comprises noise filtering said first filtered image.

65. A portable digital image acquisition device according to claim 54, wherein the method further comprises applying color correction to said first filtered image or a noise filtered image or both.

66. A portable digital image acquisition device according to claim 54, wherein the method further comprises:
    acquiring a first partially exposed image from an image sensor; acquiring a second further exposed image from said image sensor; and subsequently resetting said image sensor,
    wherein said first relatively underexposed and sharp image of a scene are obtained by subtracting said first partially exposed image from said second further exposed image.

67. A portable digital image acquisition device according to claim 66, wherein said second relatively well exposed and blurred image is obtained from said image sensor just prior to said resetting.

68. A portable digital image acquisition device, comprising a lens, an image sensor for capturing a digital image, a processor, and one or more processor-readable media having processor-readable code embedded therein for programming the processor to perform:
- obtaining a first relatively underexposed and sharp image of a scene;
- obtaining a second relatively well exposed and blurred image, nominally of the same scene
- providing a portion of said first relatively underexposed image as an input signal to an adaptive filter;
- providing a corresponding portion of said second relatively well exposed image as a desired signal to said adaptive filter;
- adaptively filtering said input signal to produce an output signal by multiplying the input signal by one or more coefficients that are calculated from values of the input signal and the desired signal; and
- constructing a first filtered image,. from said output signal, relatively less blurred than said second image.

69. A portable digital image acquisition device according to claim 68, wherein the method further comprises:
- providing a portion of said first filtered image as said input signal to an adaptive filter;
- providing a corresponding portion of said second image as a desired signal to said adaptive filter;
- further adaptively filtering said input signal to produce a further output signal;
- constructing a further filtered image from said further output signal relatively less blurred than said first filtered image.

70. A portable digital image acquisition device according to claim 69, wherein said first and second images are in RGB format to produce said first filtered image and has image portions that comprise a respective color plane of said first and second images;
wherein said providing a portion of said first filtered image comprises converting said first filtered image to YCC format;
wherein said method further comprises converting said second image to YCC format; and wherein said image portions for further adaptive filtering comprise a respective Y plane of said converted image.

71. A portable digital image acquisition device according to claim 70, wherein said first and second images are in YCC format and, for producing said first filtered image; and wherein said image portions comprise a respective Y plane of said first and second images;
wherein said providing a portion of said first filtered image comprises converting said first filtered image to RGB format;
wherein said method further comprises converting said second image to RGB format; and
wherein said image portions for further adaptive filtering comprise a respective color plane of said converted image.

72. A portable digital image acquisition device according to claim 68, wherein said adaptively filtering is performed one of row or column wise on said input signal and wherein further adaptively filtering is performed on the other of row or column wise on said input signal.

73. A portable digital image acquisition device according to claim 68, wherein the method further comprises noise filtering said first filtered image.

74. A portable digital image acquisition device according to claim 68, wherein the method further comprises applying color correction to one of said first filtered image or a noise filtered image.

75. A portable digital image acquisition device according to claim 70, wherein said first and second images are in RGB format and wherein said image portions comprise a respective color plane of said first and second images.

76. A portable digital image acquisition device according to claim 75, wherein said adaptively filtering includes producing a set of filter coefficients from a combination of said input signal and a error signal being the difference between said desired signal and said output signal; and wherein the method further comprises constructing each color plane of said first filtered image from a combination of said filter coefficients and said input signal color plane information.

77. A portable digital image acquisition device as claimed in claim 68, wherein the method further comprises:
- prior to adaptive filtering, estimating a point spread function, PSF, for said second image; and
- de-blurring said second image with said point spread function.

78. A portable digital image acquisition device according to claim 77, wherein said de-blurring is performed in response to said PSF being less than a pre- determined threshold.

79. A portable digital image acquisition device according to claim 68, wherein the method further comprises amplifying luminance characteristics of said under exposed image prior to said adaptively filtering.

* * * * *